(12) United States Patent
Ishii et al.

(10) Patent No.: US 7,338,114 B2
(45) Date of Patent: Mar. 4, 2008

(54) CONSTRUCTION MACHINE

(75) Inventors: Hajime Ishii, Youkaichi (JP); Shogo Kimura, Ritto (JP); Teruo Irino, Shiga (JP); Hajime Yoshida, Omihachiman (JP); Shigeru Hirasawa, Ritto (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 311 days.

(21) Appl. No.: 10/550,955

(22) PCT Filed: Aug. 20, 2004

(86) PCT No.: PCT/JP2004/012318

§ 371 (c)(1),
(2), (4) Date: Sep. 28, 2005

(87) PCT Pub. No.: WO2005/025968

PCT Pub. Date: Mar. 24, 2005

(65) Prior Publication Data
US 2006/0254095 A1    Nov. 16, 2006

(30) Foreign Application Priority Data
Sep. 10, 2003   (JP) .............................. 2003-318768

(51) Int. Cl.
*B62D 33/07* (2006.01)
(52) U.S. Cl. .............................. 296/190.05; 180/89.15; 180/89.16; 180/89.18
(58) Field of Classification Search ........... 296/190.05, 296/190.06, 190.04; 180/89.14, 89.15, 89.16, 180/89.18, 89.19
See application file for complete search history.

(56) References Cited

U.S. PATENT DOCUMENTS

| 4,116,484 A | * | 9/1978 | Mangless ................ 296/190.06 |
| 4,811,983 A | * | 3/1989 | Watts et al. ........... 296/190.05 |
| 5,042,602 A | * | 8/1991 | Nakatani et al. ........... 180/68.1 |
| 5,518,358 A | * | 5/1996 | Aschroft et al. ............. 414/685 |
| 5,520,500 A | * | 5/1996 | McIlwain et al. ........... 414/685 |
| 5,941,330 A | * | 8/1999 | Miller et al. .............. 180/89.15 |
| 6,502,896 B1 | * | 1/2003 | Nakata et al. ......... 296/190.05 |
| 6,543,563 B1 | * | 4/2003 | Muraro ..................... 180/89.12 |
| 6,910,731 B2 | * | 6/2005 | Albright et al. ....... 296/190.05 |
| 2007/0080011 A1 | * | 4/2007 | Kang ..................... 180/89.14 |

FOREIGN PATENT DOCUMENTS

| JP | 60-34966 | 3/1985 |
| JP | 8-188181 | 7/1996 |
| JP | 2000-72048 A | 3/2000 |
| JP | 2003-221841 | 8/2003 |

* cited by examiner

*Primary Examiner*—Jason S Morrow
(74) *Attorney, Agent, or Firm*—Mattingly, Stanger, Malur & Brundidge, PC

(57) ABSTRACT

A front side of a floor panel (15) is pivotally supported on a floor panel support mechanism (21), permitting tilting of the floor panel in a forward direction with respect to a revolving frame (5) by way of a tilting mechanism (30). The tilting mechanism (30) has a guide rail assembly (33) which is pivotally supported on the side of the revolving frame (5), a screw rod (34) which is rotatably supported on the guide rail assembly (33), and a displacement member (35) which is attached to the floor panel (15) and held in threaded engagement with the screw rod (34). The floor panel (15) and a cab (29) are tilted up in the forward direction upon rotationally driving the screw rod (34) to translate the displacement member (35) constituting the tilting mechanism (30).

9 Claims, 20 Drawing Sheets

CONSTRUCTION MACHINE

TECHNICAL FIELD

This invention relates to a construction machine such as hydraulic excavator, hydraulic crane or the like, and more particularly to a construction machine with a floor panel which can be tilted relative to a frame of the machine.

BACKGROUND ART

Generally, as a construction machine, a hydraulic excavator is constituted by a vehicular automotive lower structure, an upper revolving structure which is rotatably mounted on the automotive lower structure, and a working mechanism which is provided liftably on a front portion of the upper revolving structure.

The upper revolving structure is largely constituted by a revolving frame, an engine which is mounted on the rear side of the revolving frame, a counterweight attached to a rear end portion of the revolving frame on the rear side of the engine, a flat plate-like floor panel provided on the revolving frame on the front side of the engine, an operator's seat provided on the floor panel, and a housing or cover structure like a canopy or a cab which is provided overhead the operator's seat.

Among hydraulic excavator type construction machines are small-size hydraulic excavators which are generally called "mini shovels", and are preferably used at small-spaced working area. In the case of a small-size hydraulic excavator which lacks spaces for accommodating various equipments, it has been the usual practice to locate control valves, revolving motor and associated equipments under a floor panel.

On the other hand, upon lifting a rear end portion, the floor panel is turned about a supporting point at its fore end and tilted up to permit an access to control valves, revolving motor or other equipments which are located under the floor panel, for example, at the time of maintenance and service.

More particularly, a floor support mechanism is provided between front side of the revolving frame and a front end of a floor panel thereby to tiltably support the floor panel, permitting to tilt up the floor panel in forward or rearward direction turning about a supporting point at a fore end of the floor panel together with an operator's seat. In addition, gas dampers are provided between the lower side of the floor panel and the revolving frame, so that the floor panel can be tilted up in the forward direction by biasing force of the gas dampers, turning about a supporting point on the floor support mechanism (e.g., Japanese Patent Laid-Open No. 2000-72048).

In the case of the hydraulic excavator according to the above-mentioned prior art, the floor panel is tilted up by biasing force of gas dampers which are provided on the lower side of the floor panel. However, a great weight is put on the floor panel by the operator's seat, cab, levers, pedals, valves, indicators and instruments, and air conditioner which are installed on the floor panel. Therefore, in the above-mentioned prior art, two to four gas dampers are provided to lift up the heavy floor panel.

However, in case two to four gas dampers are provided under a floor panel, they stand as an obstacle in the way of a service man even when the floor panel is tilted up for the purpose of maintenance and service, obstructing to reach an equipment which needs inspection or repair work and thus making it difficult to perform maintenance jobs in an efficient manner.

Besides, dampers which are accommodated under a floor panel are limited in size, particularly in stroke length, and therefore unable to tilt up the floor panel through a large angle. If gas damper positions are brought closer to a supporting point for tilting the floor panel through a larger angle, it becomes necessary to apply a greater force by the use of gas dampers of an objectionably large size or by the use of an objectionably large number of gas dampers.

On the other hand, the gas dampers are constantly biased force in the direction of uplifting the floor panel, so that, as soon as a lock is canceled to tilt the floor panel, the gas dampers in a contracted state are stretched to a fully expanded state at one stroke. Therefore, the floor panel is abruptly lifted up as soon as a lock is canceled to tilt the floor panel. In addition, there is still another problem that a great force is required for pushing down the floor panel against the biasing force of the gas dampers.

Furthermore, in case of gas leaks due to deterioration of a seal member, it becomes difficult for the gas dampers to hold the floor panel in the tilted state. This problem gives rise to another problem that a stopper has to be provided between the revolving frame and the floor panel thereby to hold the floor panel in a lifted state even in the event of gas leaks from the gas dampers.

DISCLOSURE OF THE INVENTION

In view of the problems with the above-mentioned prior art, it is an object of the present invention to provide a construction machine with a tilting mechanism which can tilt up a floor panel to open up a large space between the floor panel and a frame, facilitating maintenance and service of engine and hydraulic equipments.

It is another object of the present invention to provide a construction machine with a tilting mechanism which can tilt up a floor panel safely and easily by improved handling.

The present invention is directed to a construction machine which is equipped with a frame which is provided with a working mechanism located on the front side thereof, an engine located in a rear side of the frame, a floor panel provided on the frame in front of the engine, and an operator's seat provided on the floor panel.

According to the present invention, in order to achieve the above-stated objectives, there is provided a construction machine which comprises: a floor panel support mechanism provided between front end portions of the frame and floor panel, and connected to front end of the floor panel through a supporting point in tilting up and down the floor panel together with the operator's seat; and a tilting mechanism provided between the frame and the floor panel on the rear side of the floor panel support mechanism and adapted to tilt up and down the floor panel by way of a pivoting point provided on the side of the frame and a displacement point provided on the side of the floor panel and translated to an arbitrary position, tilting up the floor panel in forward direction to a degree commensurate with a distance of travel of the displacement point in forward direction.

With the arrangements just described, when the floor panel is in a vehicle drive position on the frame, the displacement point is located in a position in the vicinity of the pivoting point of the tilting mechanism. If the displacement point is displaced in a direction away from the pivoting point of the tilting mechanism, the floor panel is tilted up in forward direction to an extent commensurate with the distance of travel of the displacement point. At this time, the displacement point can be stopped at an arbitrary position to tilt up the floor panel freely through a necessary angle.

Therefore, for example, at the time of maintenance and service of the engine, the floor panel can be tilted up to a suitable degree depending upon contents of service work, permitting to carry out various jobs in an efficient manner.

According to the present invention, preferably the tilting mechanism is mounted on a side panel of the floor panel to extend in forward and rearward directions of the machine, and the displacement point is moved forward or rearward by an externally applied driving force. In this case, the displacement point can be displaced by driving the tilting mechanism from outside, and a tilt-up operation for the floor panel can be performed safely in a facilitated manner.

According to the present invention, the tilting mechanism comprises a screw rod having a base end thereof pivotally supported on the frame, and a displacement member provided between the floor panel and the screw rod and held in threaded engagement with the screw rod for translatiolnal movement according to rotation of the screw rod, and a pivoting point provided on the base end of the screw rod and a displacement point provided on the displacement member.

With the arrangements just described, upon rotating the screw rod of the tilting mechanism which is pivotally supported on the frame, the displacement member which is in threaded engagement with the screw rod can be translated toward a fore end of the screw rod.

According to the present invention, the tilting mechanism comprises a guide rail assembly having a base end thereof pivotally supported on the side of the frame for upward and downward pivoting movements and having a fore end extended forward in a free state, a screw rod extended along and in longitudinal direction of the guide rail assembly and rotatably supported on the guide rail assembly, and a displacement member rotatably mounted on the side of the floor panel and held in threaded engagement with the screw rod for movement in forward and rearward directions along the guide rail assembly.

With the arrangements just described, upon rotating the screw rod on the guide rail assembly which is provided on the side of the frame, the displacement member which is in threaded engagement with the screw rod is translated forward along guide rail assembly. At this time, the guide rail assembly can function as a support post for holding the floor panel in a tilted state relative to the frame.

Through an angle commensurate with a distance of a forward travel toward the fore end of the screw rod of the displacement member which is attached to the side of the floor panel, the rear side of the floor panel is lifted and tilted up in a forward direction on a floor panel support mechanism which is provided under the front side of the floor panel. When the floor panel is tilted up in this manner, a large working space free of gas dampers is opened up between the frame and the floor panel.

As a consequence, a service man can easily reach the equipments under the floor panel, utilizing the large space for carrying out a maintenance work in a safe and efficient manner.

In addition, since the tilting mechanism utilizes threaded engagement of displacement member with the screw rod for tilting up the floor panel, it is possible to prolong the distance of travel of the displacement member. Namely, it is possible to tilt up the floor panel through a larger angle if necessary to open a large space between the frame and the floor panel.

On the other hand, as mentioned above, the tilting mechanism utilizes threaded engagement of the displacement member with the screw rod, instead of constantly generating biasing force like gas dampers. There is no possibility of the floor panel being tilted up abruptly by biasing force. The tilted floor panel can be pushed down easily without applying a large force. This means that the floor panel can be tilted up extremely easily and in a safe manner.

Furthermore, the tilting mechanism which utilizes threaded engagement of the displacement member with the screw rod can stop and fix the floor panel at an arbitrary tilted position in an efficient manner, without using a stopper between the frame and the floor panel. Besides, it is possible to set the extent (angle) of tilt-up of the floor panel at an arbitrary value for carrying out maintenance and service in an efficient manner.

According to a preferred form of the present invention, the guide rail assembly is in the form of a rectangular frame comprising a fitting base member pivotally supported on the side of the frame, a pair of rail members extended forward from the fitting base member in parallel relation with each other, and an end connector attached to and connecting fore ends of the rail members; the screw rod being extended between the rail members, having a base end disposed in a free state and having a fore end fitted in the end connector; the displacement member being located between the rail members of the guide rail assembly and held in threaded engagement with the screw rod; and the displacement member being translated along the guide rail assembly upon rotationally driving a fore end of the screw rod.

With the arrangements just described, upon rotationally driving a fore end of the screw rod, the displacement member which is in threaded engagement with the screw rod is moved along and between rail members on the guide rail assembly, and the floor panel is tilted up through an angle commensurate with the distance of travel (displacement) of the displacement member. In addition, in this case only fore end of the screw rod are fitted in the end connector of the guide rail assembly. Therefore, in the event the screw rod is rotated in a distorted state, its base ends being free ends are put in an oscillatory movement to reduce operational resistance.

According to another preferred form of the present invention, the guide rail assembly is in the form of a rectangular frame comprising a fitting base member pivotally supported on the side of the frame, a pair of rail members extended forward from the fitting base member in parallel relation with each other, and an end connector attached to and connecting fore ends of the rail members; the screw rod being extended between the rail members, and having a base end and a fore end thereof fitted in the fitting base member and the end connector, respectively; the displacement member being located between the rail members of the guide rail assembly and held in threaded engagement with the screw rod; and the displacement member being translated along the guide rail assembly upon rotationally driving a fore end of the screw rod.

With the arrangements just described, upon rotationally driving a fore end of the screw rod, the displacement member which is in threaded engagement with the screw rod is moved along and between rail members on the guide rail assembly, and the floor panel is tilted up through an angle commensurate with the distance of travel (displacement) of the displacement member. In addition, since the screw rod is supported at opposite ends on the guide rail assembly, it becomes possible to improve the action of the displacement member in operation and to prolong the service life of the screw rod.

According to the present invention, it is desirable that the construction machine further comprises; a support member provided on the frame in the vicinity of the engine to support a rear side portion of the floor panel; and the guide rail assembly of the tilting mechanism having a base end thereof being pivotally supported on the support member and the displacement member of the tilting mechanism being mounted on a side panel portion of the floor panel.

With the arrangements just described, the guide rail assembly of the tilting mechanism is mounted on the support member, while the displacement member of the tilting mechanism is attached to a side panel section of the floor panel. Thus, the tilting mechanism can be installed by the use of existing parts of a construction machine. Besides, since the displacement member is attached on the side of the floor panel, the tilting mechanism can be applied to both in case of attaching a cab type construction machine and a canopy type construction machine on the floor panel.

According to the present invention, preferably the support member comprises a support base extended laterally in rightward and leftward directions over the engine, and a plural number of posts extended downward from the support base and attached to the frame; one of the posts at a lateral side of the floor panel being angularly bent in forward direction to provide an inclined surface section thereon; and a bracket being mounted on the inclined surface section to support a base end of the tilting mechanism.

With the arrangements just described, considering that the fore end of the tilting mechanism is turned obliquely upward when the floor panel is tilted up, the base end of the tilting mechanism is mounted on a forwardly inclined surface section of a support post. Therefore, a large load resulting from tilt-up of the floor panel can be securely sustained by the inclined surface section.

According to the present invention, the floor panel comprises a foot rest panel supporting feet of an operator who is seated on operator's seat, a partition panel rising upward from a rear side of the foot rest panel and extended rearward over the engine, and a side panel rising upright at a lateral side of the foot rest panel; and the displacement member of the tilting mechanism being mounted on the side panel of the floor panel. In this case, the displacement member of the tilting mechanism can be mounted in position by the use of a side panel of the floor panel.

Further, according to the present invention, the screw rod is provided with a tool connecting portion at a fore end thereof to permit connection of a screw driving tool for rotationally driving of the screw rod. With the arrangement just described, by rotationally driving the screw rod by a screw driving tool like an impact wrench, the floor panel can be tilted up and down quite easily.

BEST MODE FOR CARRYING OUT THE INVENTION

Hereafter, with reference to the accompanying drawings, the present invention is described more particularly by way of its preferred embodiments taking a small-size hydraulic excavator as an example of construction machine.

Referring first to FIGS. 1 through 14, there is shown a hydraulic excavator incorporating a first embodiment of the present invention.

Figure 1:
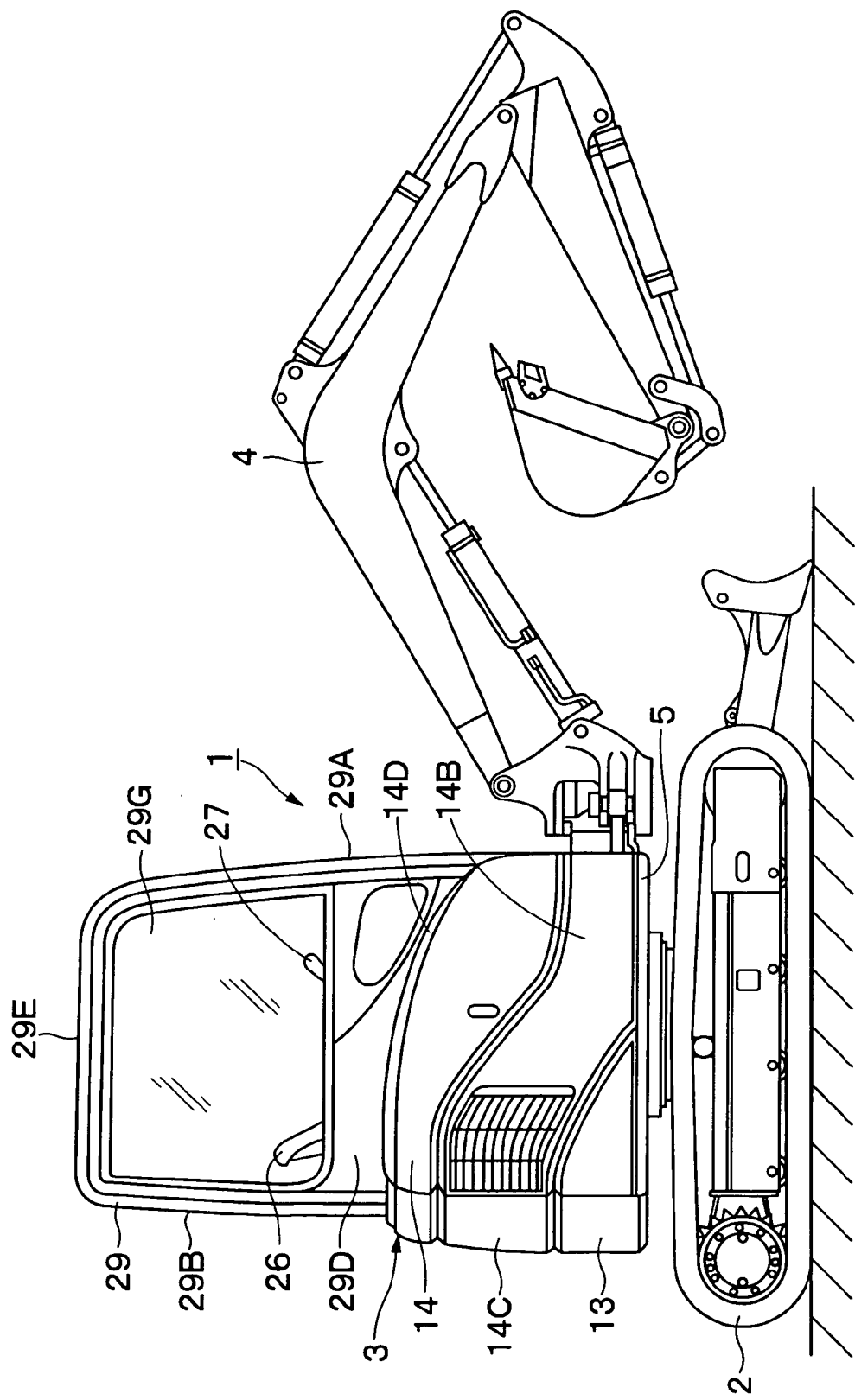
FIG. 1 is a front view of a cab-furnished hydraulic excavator incorporating a first embodiment of the present invention.

In FIG. 1, indicated at 1 is a cab-furnished hydraulic excavator as a typical example of construction machine. The hydraulic excavator 1 is constituted by an automotive crawler type lower structure 2, and an upper revolving structure 3 which is rotatably mounted on the automotive lower structure 2. A swing type working mechanism 4 to excavate a ground is mounted on a front side portion of the upper revolving structure 3 for rocking and upswing and downswing motions.

Figure 2:
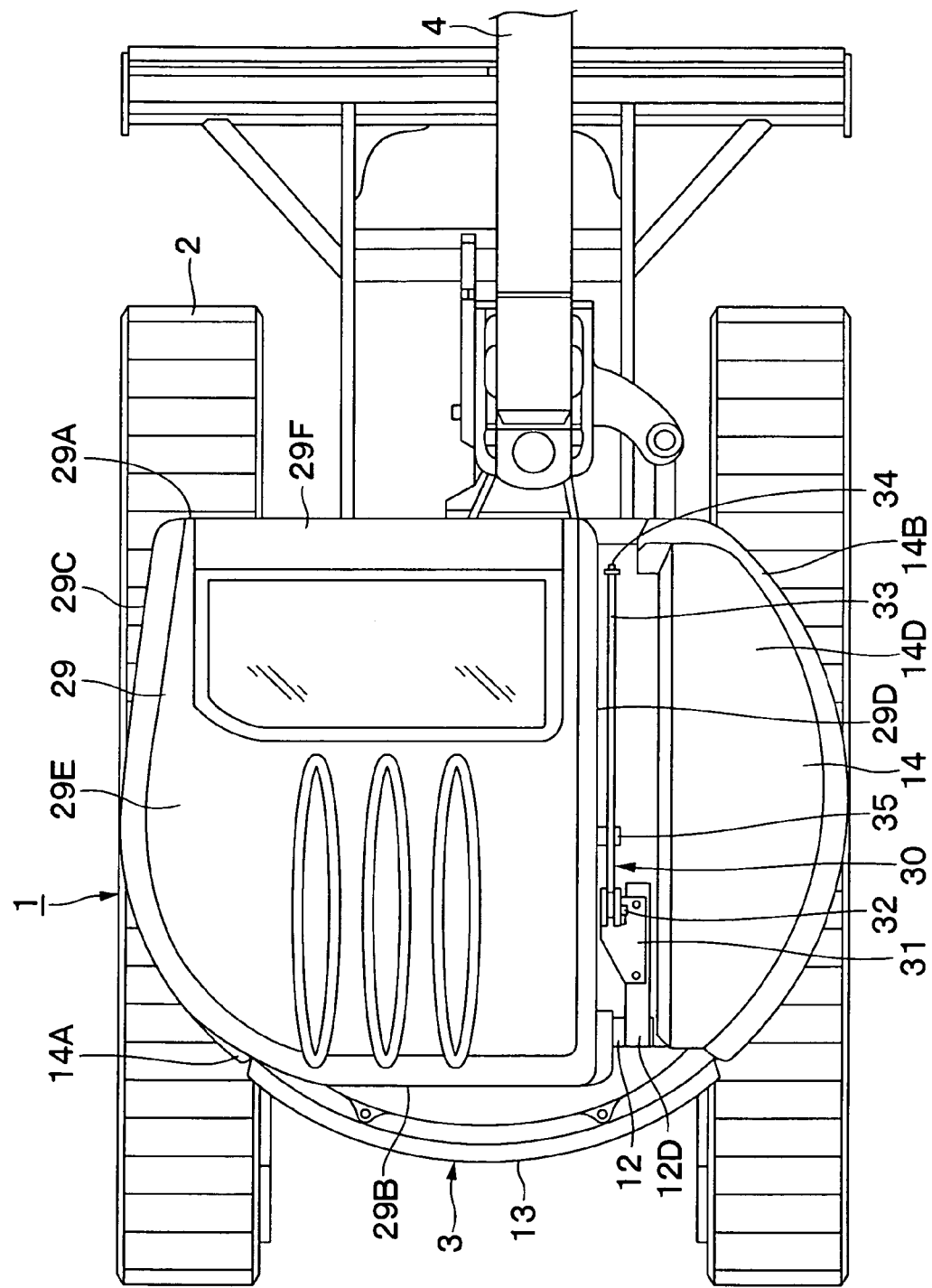
FIG. 2 is a plan view of the hydraulic excavator of FIG. 1.

When seen from above, the upper revolving structure 3 is formed substantially in a circular shape so that it can make turns within the width of the lower structure 2 (see FIG. 2). Further, the upper revolving structure 3 is largely constituted by revolving frame 5, engine 6, floor panel 15, floor panel support mechanism 21, operator's seat 26, cab 29, tilting mechanism 30, which will be described hereinafter.

Figure 3:
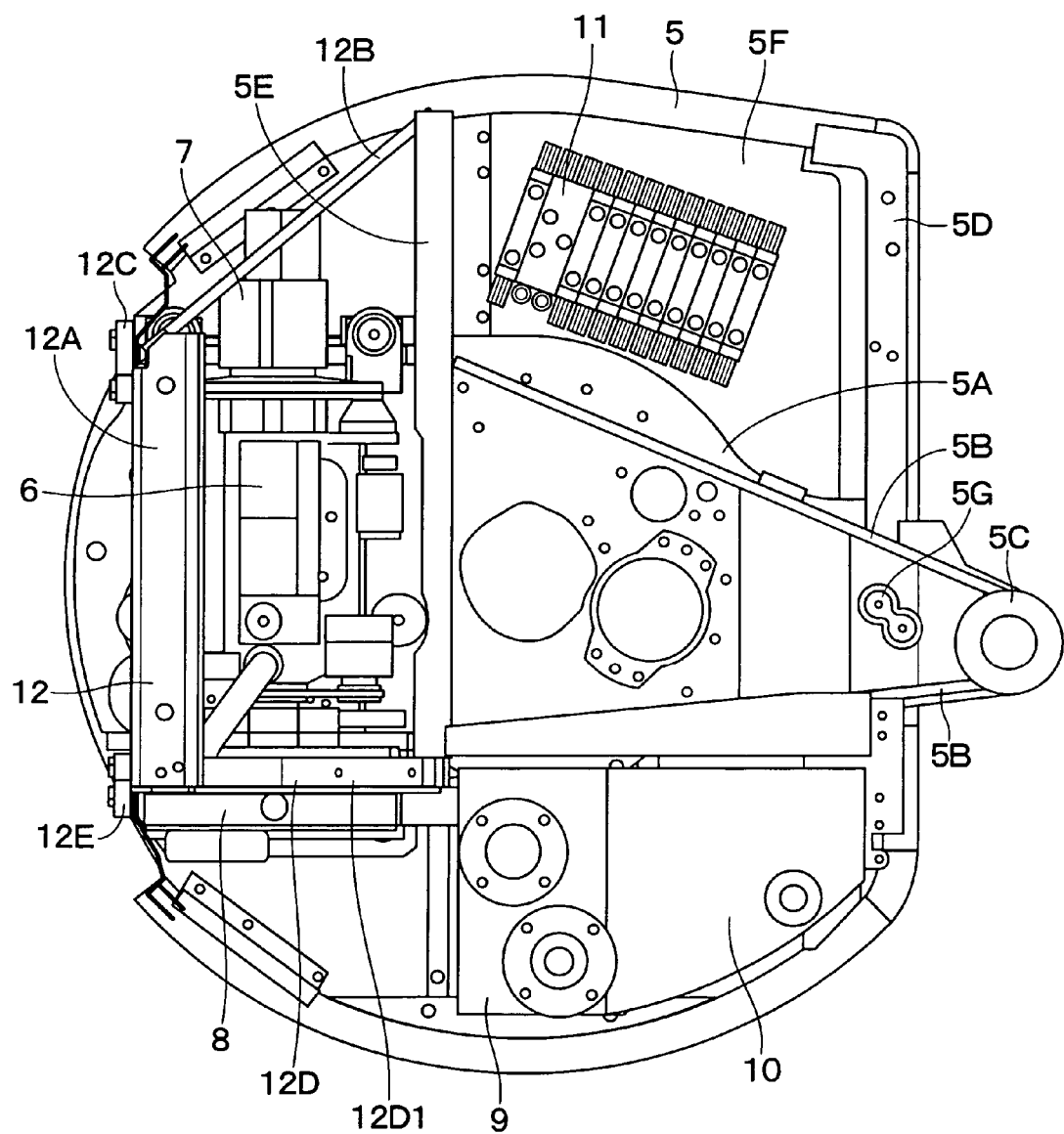
FIG. 3 is a plan view of an upper revolving structure, with floor panel and exterior cover removed to show the inside.
Figure 4:
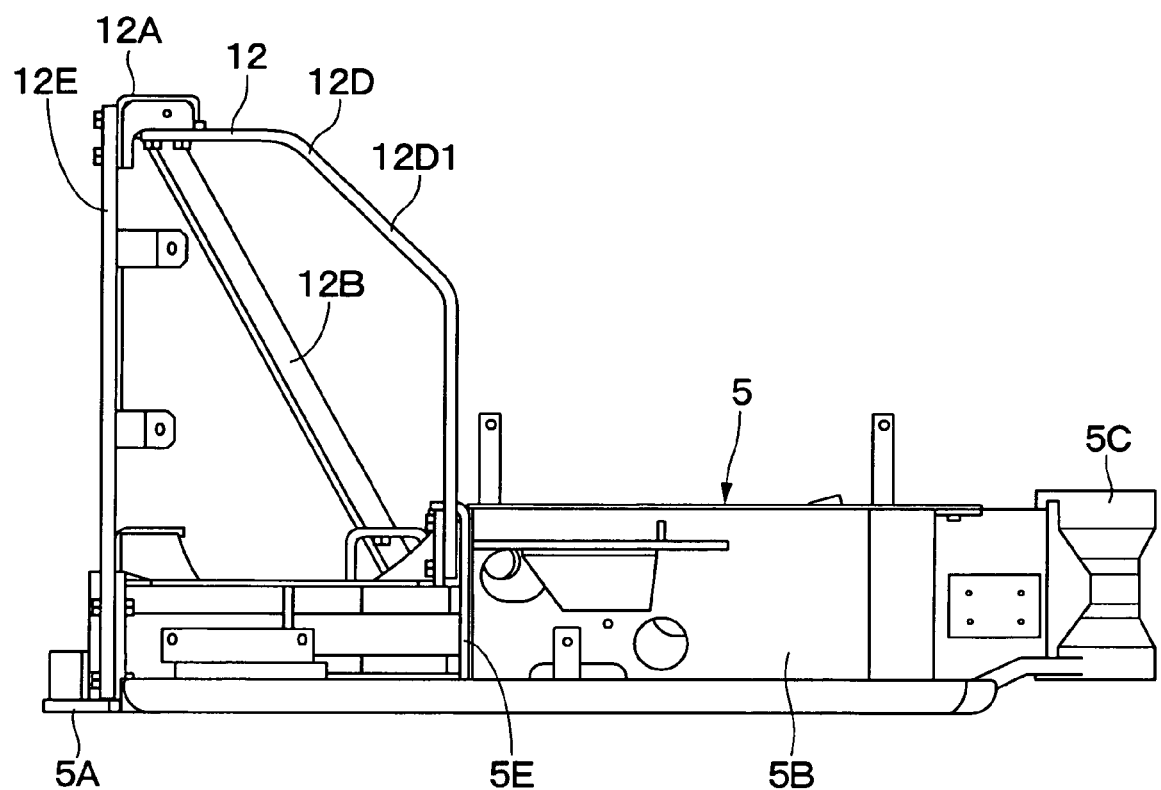
FIG. 4 is a front view of a revolving frame, with a support member attached thereto.

Indicated at 5 is a revolving frame which constitutes a base of the upper revolving structure 3. In this instance, as shown in FIGS. 3 and 4, the revolving frame 5 is largely constituted by a bottom plate 5A which is located transversely in a center position and extended toward front and rear sides of the revolving structure, a pair of vertical plates 5B which are erected in transversely spaced positions on the upper side of the bottom plate 5A, a support bracket 5C which is provided at a front end of each vertical plate 5B to support the working mechanism 4, a front beam 5D which is provided at a front position extending laterally in rightward and leftward directions, a center beam 5E which is extended in rightward and leftward directions behind the vertical plates 5B, and an under cover 5F which is provided between the front and center beams 5D and 5E. Further, located closely behind the support bracket 5C is a mount seat 5G for mounting a floor panel support mechanism 21 which will be described hereinafter.

Denoted at 6 is an engine (see FIG. 3) which is mounted on a rear side portion of the revolving frame 5. The engine 6 is mounted in a lateral position to extend laterally in rightward and leftward directions. In this instance, the engine 6 is located under a partition panel 17 of a floor panel 15 which will be described hereinafter. As a consequence, positions of the engine 6 and counterweight 13 shifted toward the front side in such a way to utilize a mounting space effectively from the standpoint of downsizing the upper revolving structure 3. Located on the left side of the engine 6 is a hydraulic pump 7 which is driven by the engine 6, and located on the right side of the engine 6 is a heat exchanger 8 like a radiator or oil cooler.

Further, indicated at 9 is an operating oil tank which is provided on a right side portion of the revolving frame 5, in a position on the front side of the heat exchanger 8. Indicated at 10 is a fuel tank which is located on the front side of the operating oil tank 9. Denoted at 11 is a control valve which is mounted on the under cover 5F of the revolving frame 5. The control valve 11 is connected to the hydraulic pump 7 and the operating oil tank 9. Further, provided centrally on the revolving frame 5 is a revolving motor (not shown) for swinging the upper revolving structure 3, and a center joint (also not shown) which supplies pressure oil to the automotive lower structure 2 while permitting revolving motions. Furthermore, a battery (not shown) is located on the upper side of the fuel tank 10.

Figure 5:
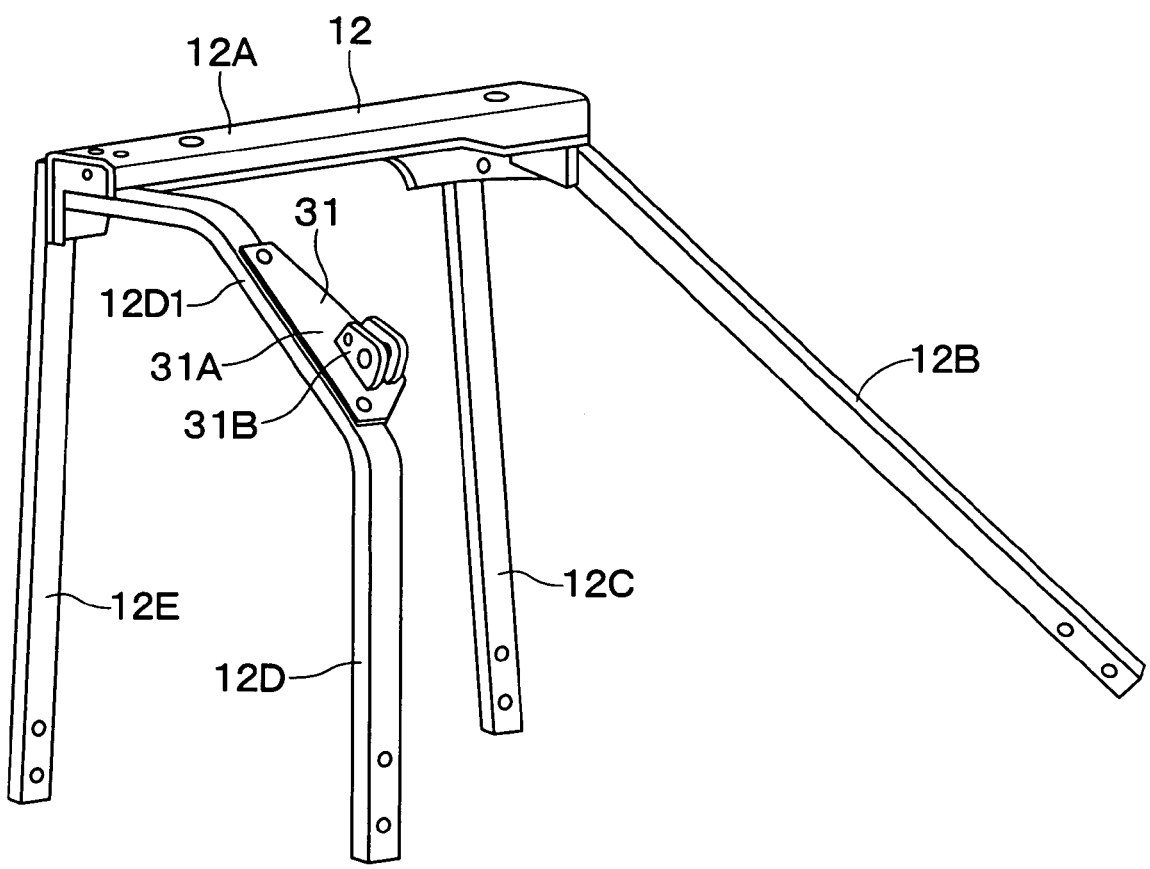
FIG. 5 is a perspective view of the support member alone.

Designated at 12 is a support member which is provided on a rear side portion of the revolving frame 5, astride of the engine 6. This support member 12 constitutes a part of the revolving frame 5. As shown in FIG. 5, the support member 12 is largely constituted by a support base 12A which is extended laterally in rightward and leftward directions overhead the engine 6 and connected with a housing mount plate 18 provided on a partition panel 17 of a floor panel 15, which will be described hereinafter, and a plural number of support posts, for example, four support posts 12B, 12C, 12D and 12E which are arranged to support the support base 12A above the engine 6.

Of the above-mentioned support posts 12B, 12C, 12D and 12E, the left front support post 12B is extended gradually downward in the forward direction from left end of the support base 12A, the left rear support post 12C is extended downward from left end of the support base 12A. The right front support post 12D which is extended forward from right end of the support base 12A is angularly bent downward at longitudinally halfway points, while right rear support post 12E is extended downward from right end of the support base 12A. Lower ends of the respective support posts 12B, 12C, 12D and 12E are securely attached to the revolving frame 5.

Figure 6:
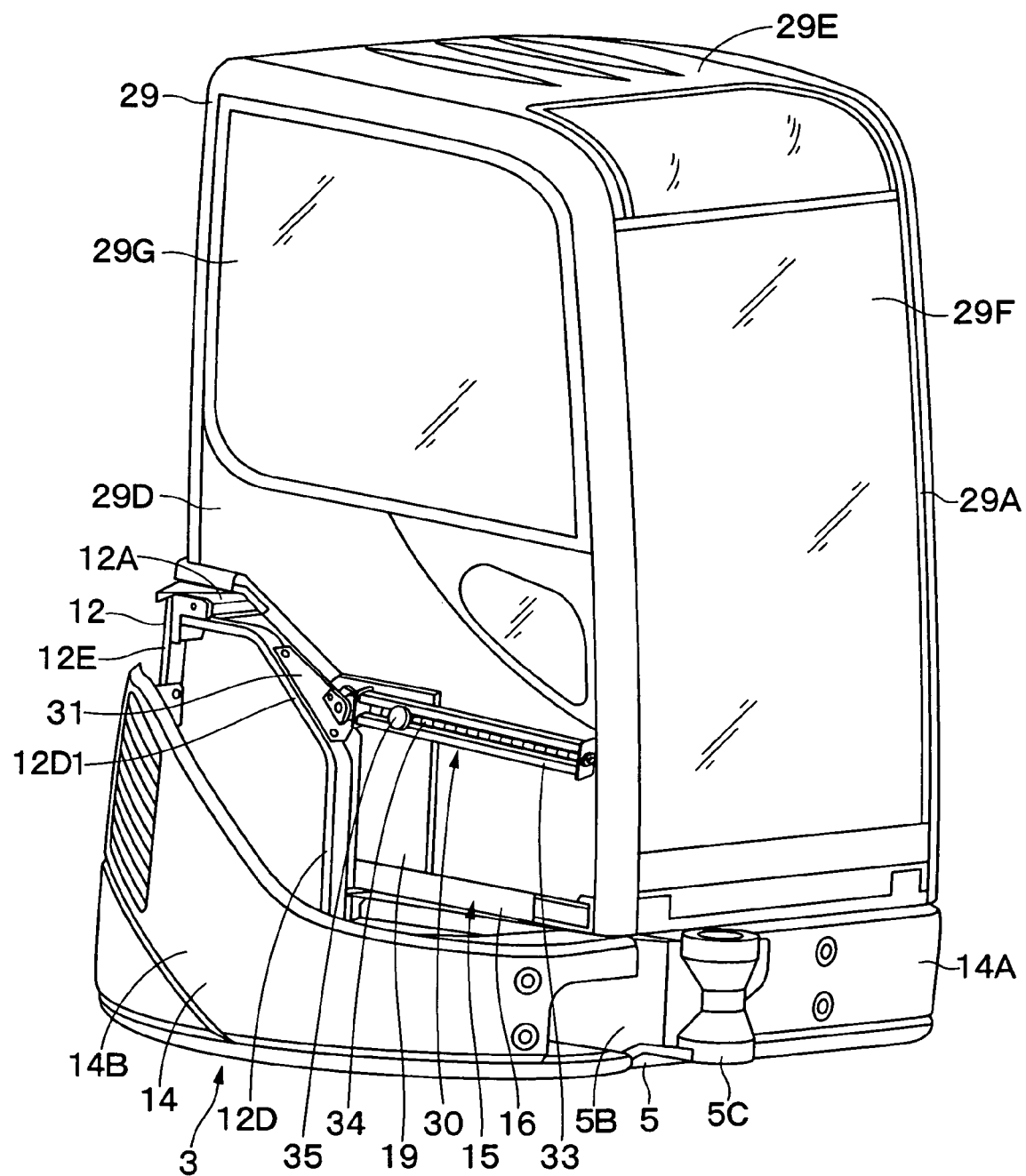
FIG. 6 is a perspective view, taken from the right front side, of the upper revolving structure, with part of exterior cover, engine and tank removed therefrom.
Figure 7:
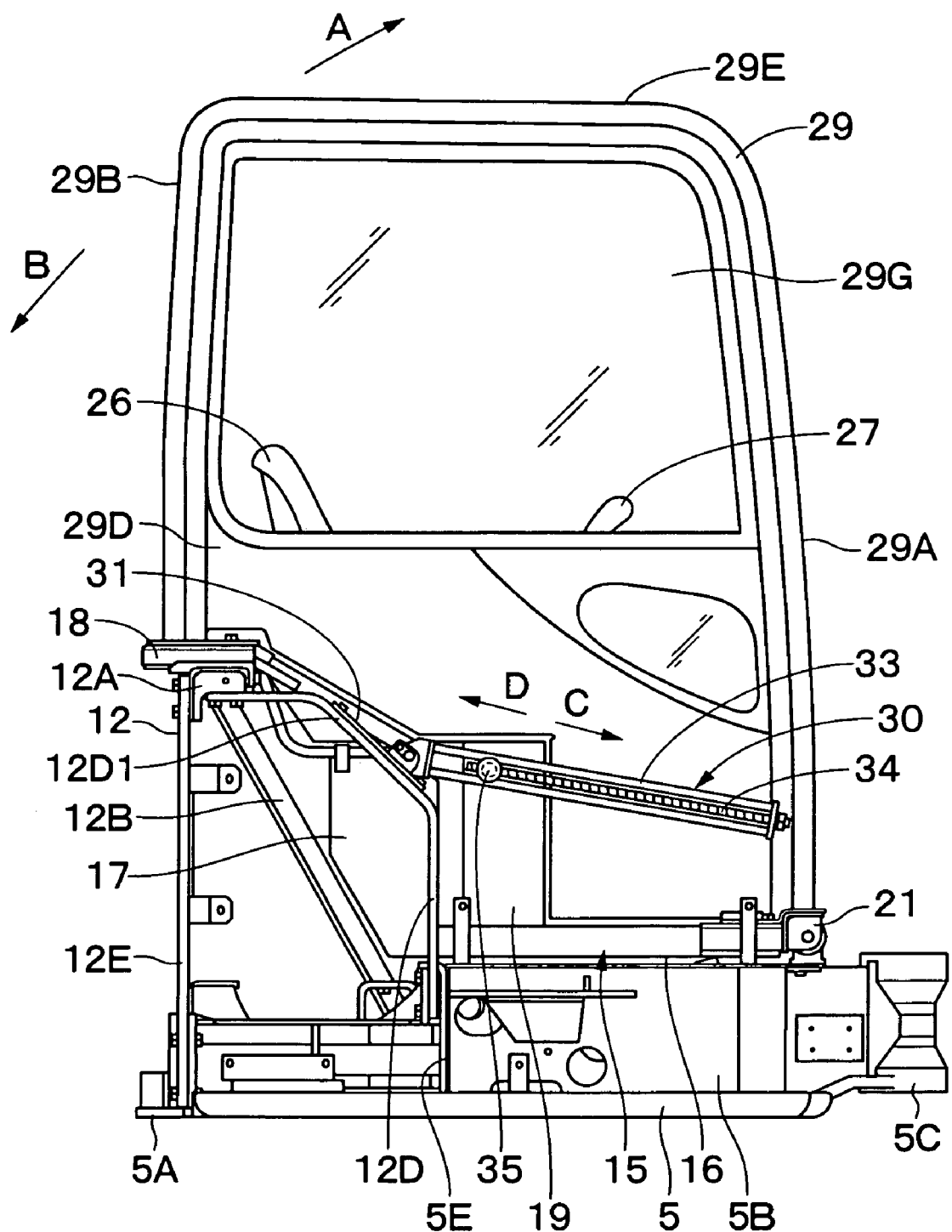
FIG. 7 is a front view of the upper revolving structure, with exterior cover, engine and tank removed therefrom.

In this instance, the right front support post 12D is located on the right side of the floor panel 15, which will be described hereinafter, and formed substantially in L-shape in order not to block the heat exchanger 8. The right front support post 12D is provided with an inclined surface section 12D1 at a longitudinally intermediate portion, and, as shown in FIGS. 6 and 7, a guide rail assembly 33 of a tilting mechanism 30, which will be described hereinafter, is mounted on the inclined surface section 12D1 through a bracket 31.

Indicated at 13 is a counterweight which is attached to the rear end of the revolving frame 5 on the rear side of the engine 6 (see FIGS. 1 and 2) to keep a weight balance with the working mechanism 4, and formed in a convexly arcuate form in transverse direction.

In the particular embodiment shown, the engine 6 is located in a position which is shifted in a forward direction to get under the partition panel 17 of the floor panel 15, so that the counterweight 13 can be located in a more forward position close to the engine 6. As a consequence, the counterweight 13 can be located within a radius of turns relative to width of the automotive lower structure 2.

Indicated at 14 is an exterior cover which is provided around the cab 29 which will be described hereinafter. This exterior cover 14 is arranged to cover the engine 6, hydraulic pump 7, heat exchanger 8, operating oil tank 9 and fuel tank 10 which are mounted on the revolving frame 5, along with the counterweight 13.

As shown in FIGS. 1, 2 and 6, the exterior cover 14 is largely constituted by a left side cover 14A which is extended forward smoothly and continuously from left end of the counterweight 13, a right side cover 14B which is extended forward smoothly and continuously from right end of the counterweight 13, an engine cover 14C which is located over an intermediate portion of the counterweight 13 and arranged to be swung open in a vertical direction, and a tank cover 14D which is openably provided at the right side of the cab 29, which will be described hereinafter, to cover the respective tanks 9 and 10. The tank cover 14D is located at a space from the cab 29 for the purpose of mounting a tilting mechanism 30, which will be described after.

Figure 8:
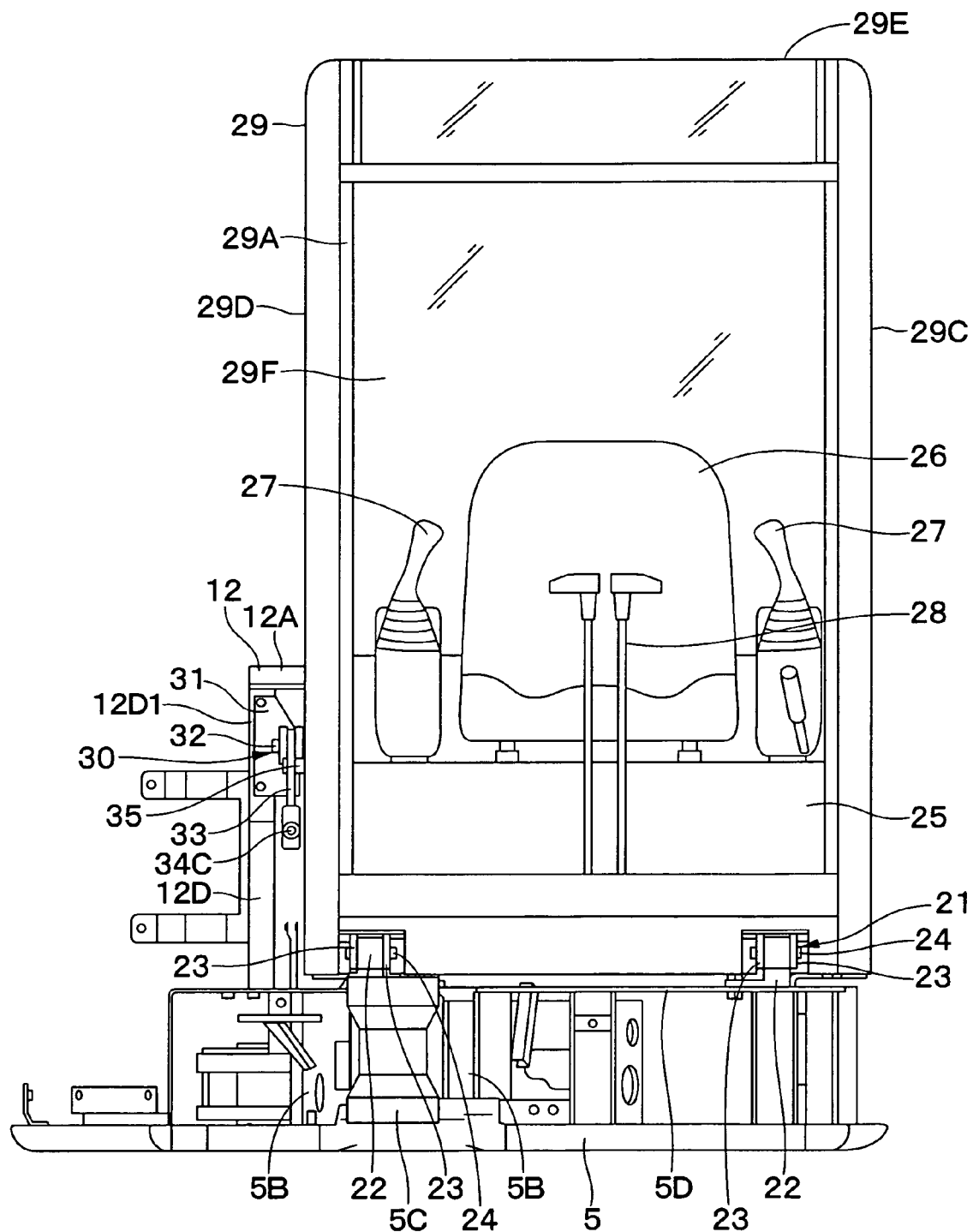
FIG. 8 is a right-hand side view of the upper revolving structure, with exterior cover, engine and tank removed therefrom.
Figure 9:
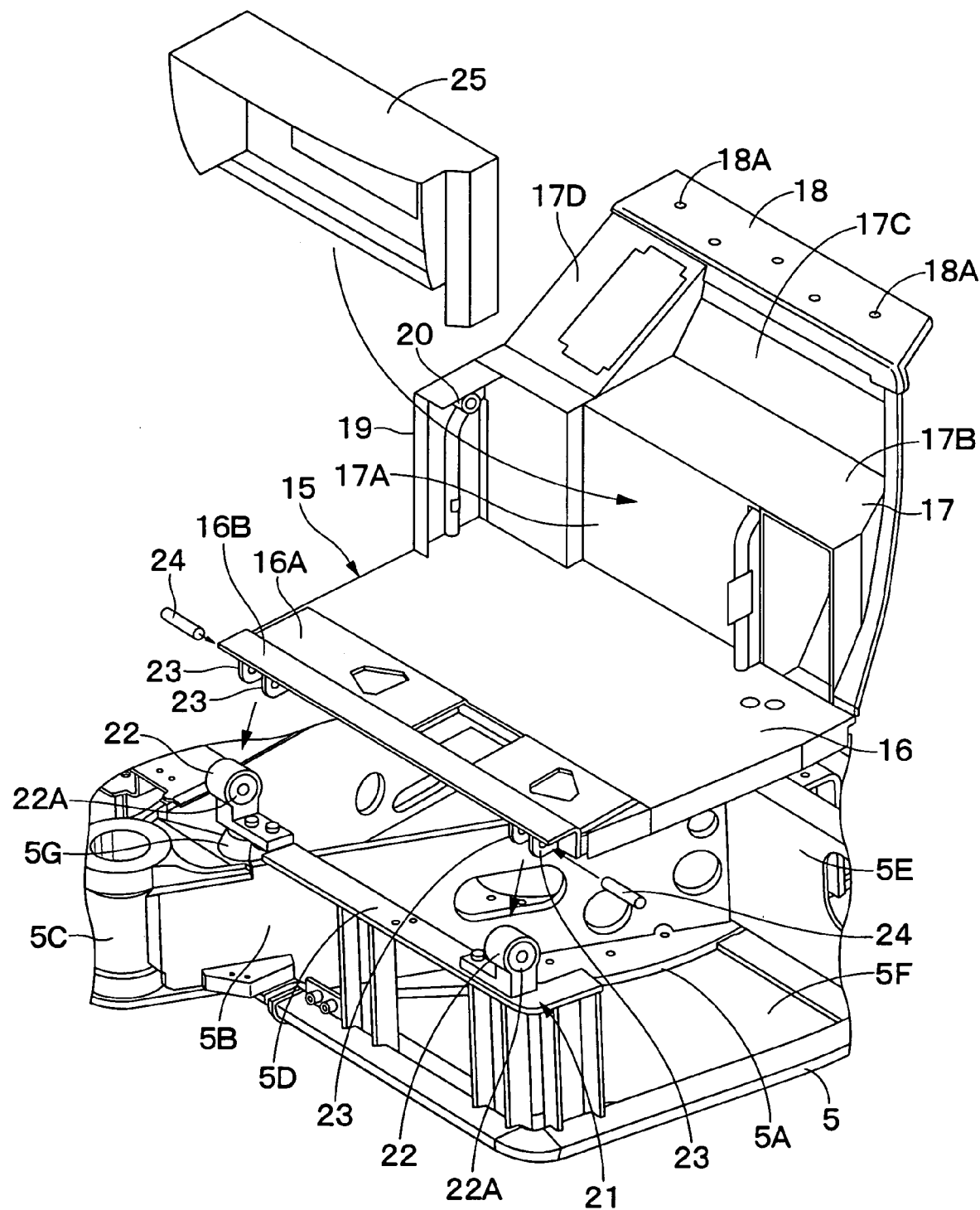
FIG. 9 is an exploded perspective view, taken from the left front side, of floor panel, floor panel support mechanism and stool member.

Denoted at 15 is a floor panel which is provided in a left section of the revolving frame 5, in a construction as shown in FIGS. 8 and 9. Namely, the floor panel 15 includes a foot rest panel 16 which support feet of an operator who is seated on an operator's seat 26 which will be described hereinafter, a partition panel 17 which is provided behind the foot rest panel 16, a housing mount plate 18 which is provided at an upper end of the partition panel 17, and an upright side panel 19 which rises upward at a position on the right side of the foot rest panel 16.

In this instance, a lever/pedal mount portion 16A is provided in a front portion of the foot rest panel 16 for mounting vehicle control levers and pedals 28 which will be described hereinafter. A support mechanism mount plate 16B is attached to the front side of the lever/pedal mount portion 16A to extend laterally in rightward and leftward directions. Attached to the support mechanism mount plate 16B are bracket members 23 of a floor panel support mechanism 21, which will be described hereinafter.

The partition panel 17, which constitutes a rear side of the floor panel 15, is arranged to stand up from behind the foot rest panel 16 and then extend rearward over the engine 6. As a consequence, the engine 6 can be accommodated under the partition panel 17. More particularly, as shown in FIG. 9, the partition panel 17 is composed of a riser wall 17A which stands up from rear end of the foot rest panel 16, a seat support deck 17B which extends rearward from upper end of the riser wall 17A, a back plate 17C which stands up from rear end of the seat support deck 17B, and an instrument mount plate 17D on the right side of the seat support deck 17B and the back plate 17C. An operator's seat 26 is mounted on the seat support deck 17B, as described more particularly hereinafter, and instruments such as switches and monitors (not shown) are mounted on the instrument mount plate 17D.

In the housing mount plate 18 which is extended transversely in rightward and leftward directions, a plural number of fitting holes 18A are bored at intervals in the transverse direction. In this instance, bolts (not shown) are placed in the fitting holes 18A at the time of mounting a rear portion of a housing, i.e., a rear portion of a cab 29 which will be described hereinafter. Besides, bolts are placed in the each fitting hole 18A at the time of mounting a housing mount plate 18 on the support base 12A of the support member 12. When the bolts are removed, the floor panel 15 is freed and can be tilted up whenever necessary.

Figure 10:
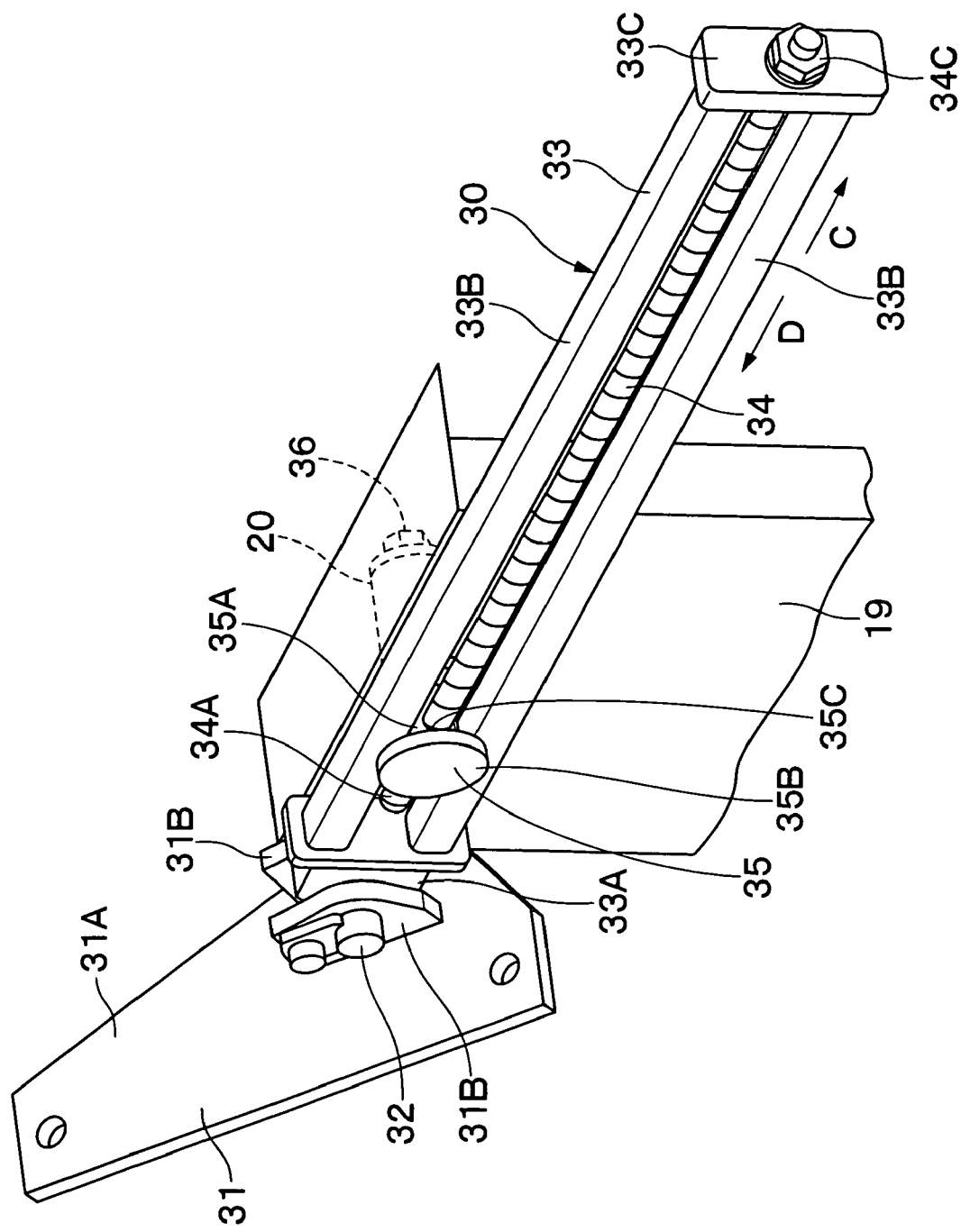
FIG. 10 is a perspective view showing on an enlarged scale a tilting mechanism and associated parts.
Figure 11:
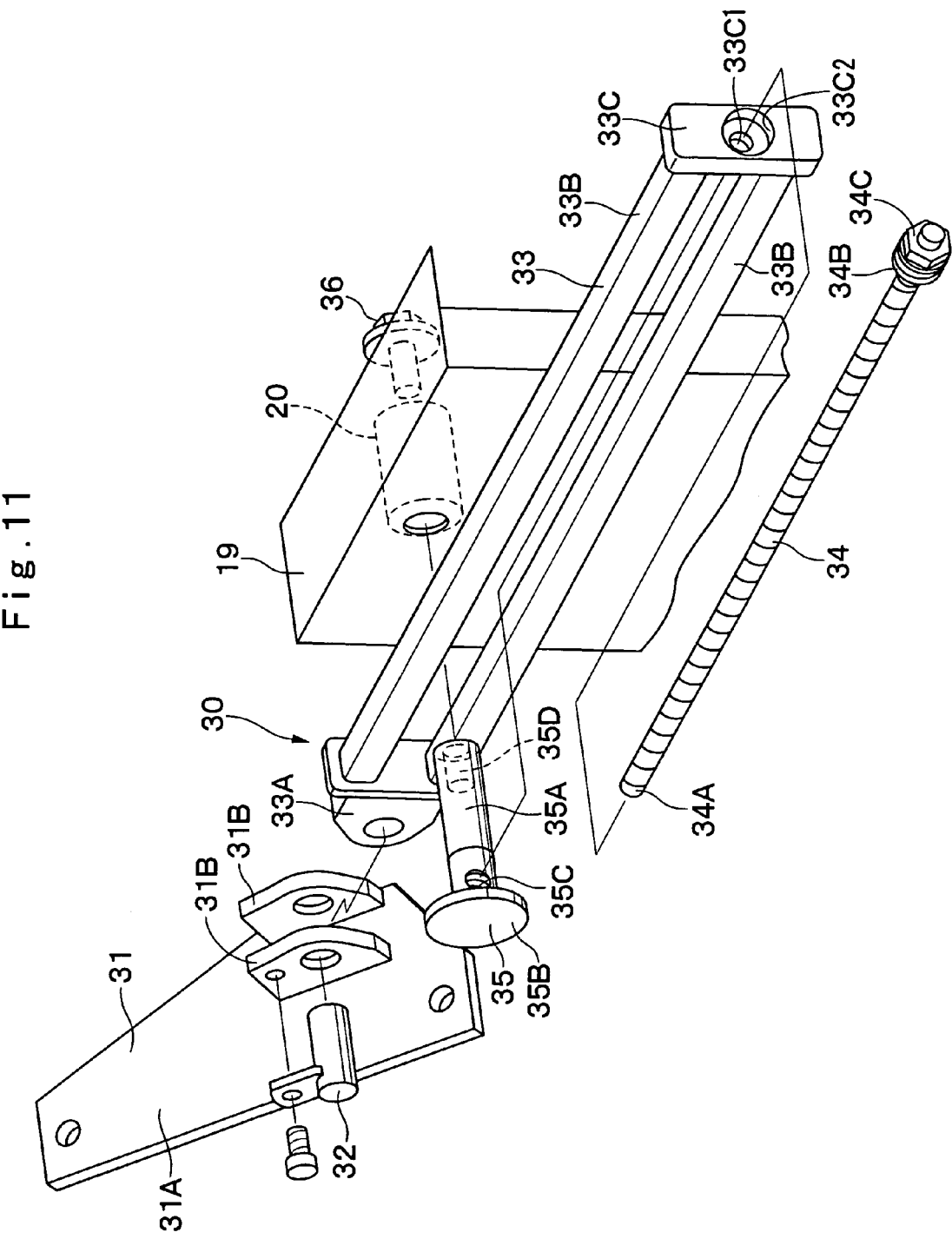
FIG. 11 is an exploded view of the tilting mechanism and associated parts.

Further, the upright side panel 19 is formed as a plate substantially in a rectangular shape, and arranged to rise upward from a rear portion of right end of the foot rest panel 16, along the instrument mount plate 17D of the partition panel 17. Further, the upright side panel 19 serves as a connecting portion when the floor panel 15 is tilted by the tilting mechanism 30 together with the operator's seat 26 and the cab 29. Besides, the upright side panel 19 is securely fixed to the foot rest panel 16 and the instrument mount plate 17D, with sufficient strength for supporting a large weight. As shown in FIGS. 10 and 11, a sleeve 20 is attached to an upper portion of the upright side panel 19, as described below.

Figure 12:
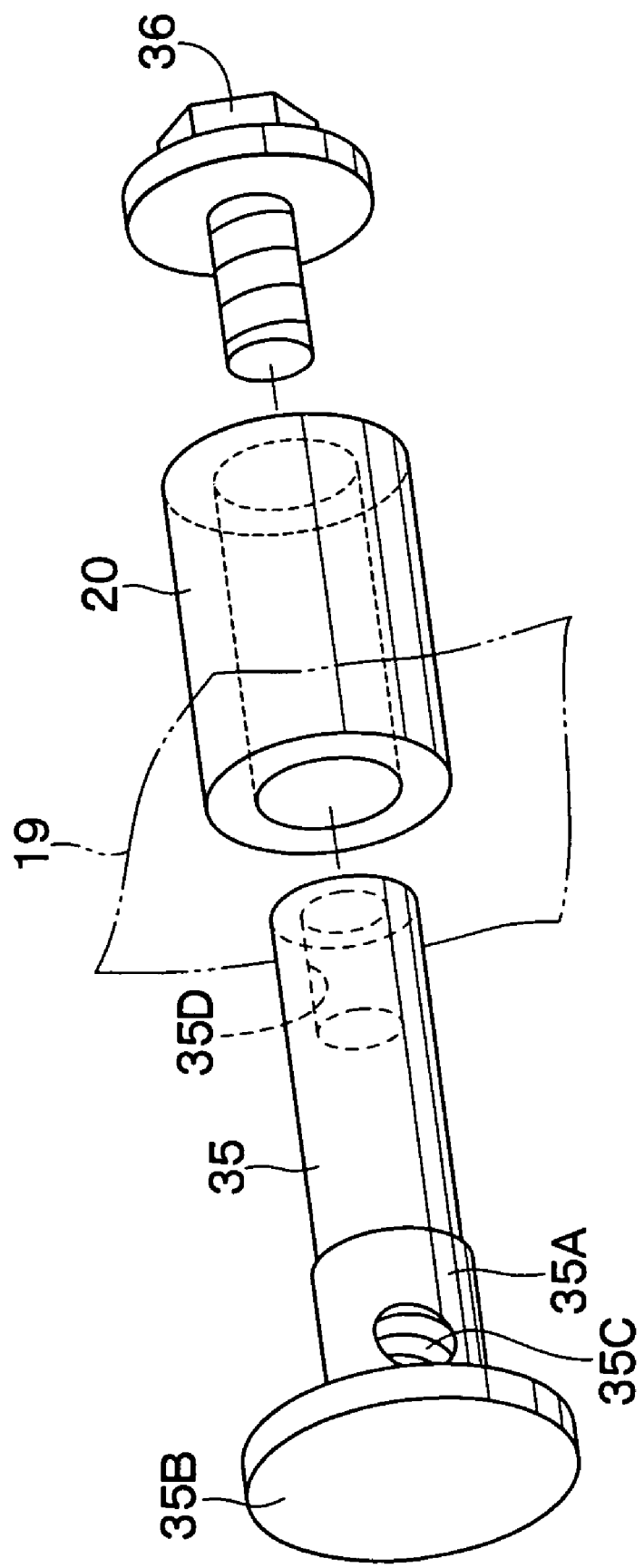
FIG. 12 is an exploded perspective view, on an enlarged scale, of a displacement member, sleeve and bolt of the tilting mechanism.

Denoted at 20 is a sleeve which is provided on an upper portion of the upright side panel 19. This sleeve 20 is formed in a tubular shape, and a displacement member 35 of the tilting mechanism 30, which will be described hereinafter, is rotatably fitted into the sleeve 20 as shown in FIG. 12. As shown in FIGS. 10 and 11, the sleeve 20 is attached to the upright side panel 19 in such a way that its axis lies in the transverse directions.

Indicated at 21 is a floor panel support mechanism which is provided between a front end of the revolving frame 5 and a front end of the foot rest panel 16. As shown in FIGS. 8 and 9, this floor panel support mechanism 21 is largely constituted by a couple of fitting members 22 which are mounted a front beam 5D and mount seat 5G which are provided at a front end of the revolving frame 5 and each having vibration insulation rubber 22A inside, right and left paired bracket members 23 which are attached to the lower side of the support mechanism mount plate 16B of the foot rest of plate 16 with corresponding to the each fitting members 22, and pins 24 which pivotally connect the bracket members 23 and the fitting members 22 through the vibration insulation rubber 22A.

Figure 13:
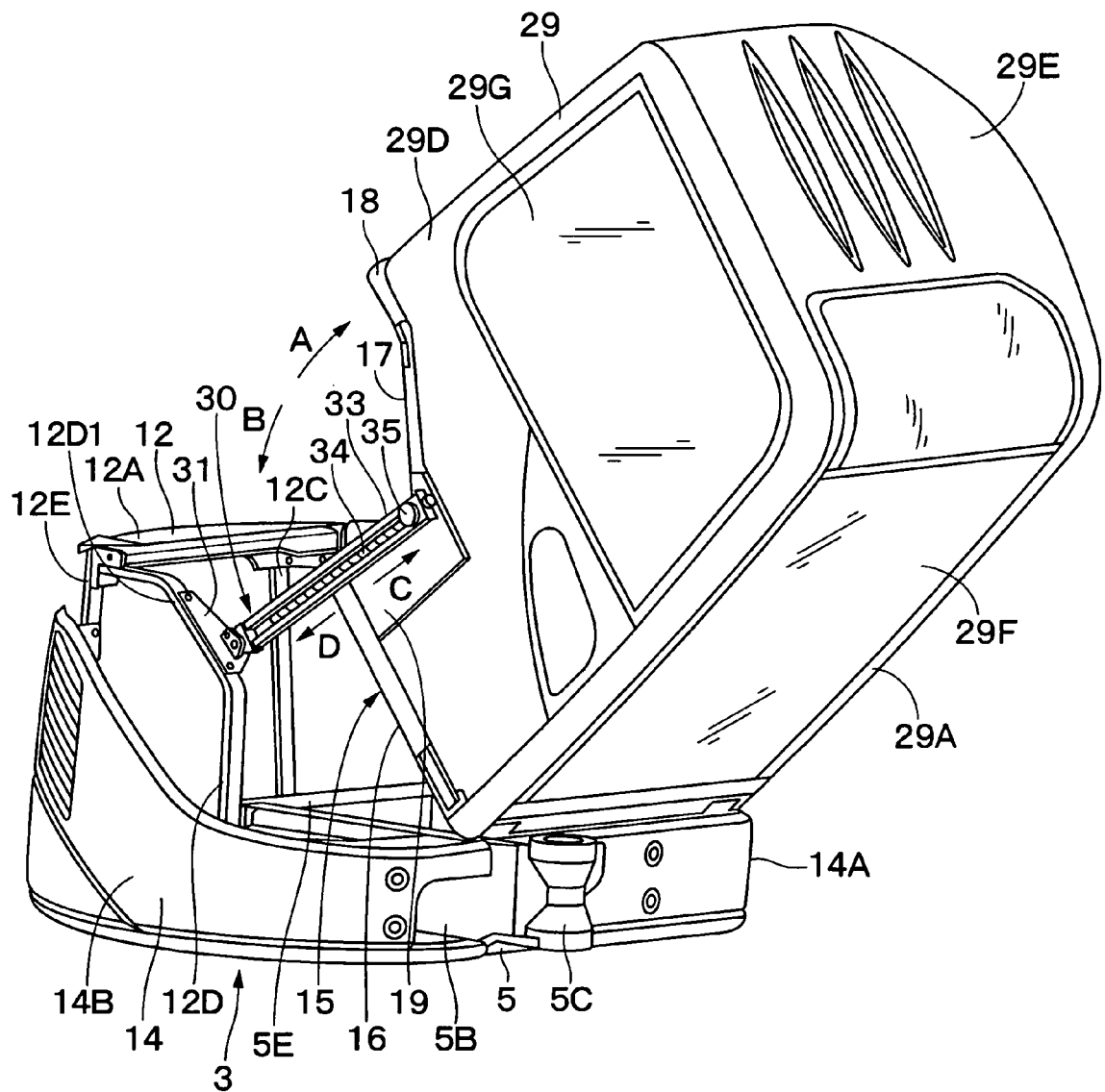
FIG. 13 is a perspective view taken from the same direction as FIG. 6, showing the floor panel and cab of the upper revolving structure which are tilted up by the tilting mechanism.

By the floor panel support mechanism 21, the floor panel 15 tiltably supported at a front end of the revolving frame 5, to turn the floor panel 15 about a transverse center axis (a rotational axis) at its front end. As a consequence, as shown in FIGS. 12 and 13, the floor panel 15 can be turned about the center axis and tilted up in forward direction (in the direction of arrow A) by lifting up the back side of the floor panel 15. It is also possible to tilt the back side of the floor panel 15 in rearward direction (in the direction of arrow B). Moreover, by the floor panel support mechanism 21, the front end of the floor panel 15 is supported in a vibration-free state relative to the revolving frame 5, by the vibration insulation rubber 22A which is provided in each one of the fitting members 22.

Indicated at 25 is a stool member which is attached to the front side of the riser wall 17A of the partition panel 17 of the floor panel 15 to support an operator's seat 26 together with the seat support deck 17B on the part of the partition panel 17.

Indicated at 26 is an operator's seat (see FIGS. 1, 7 etc.) which is provided at the top side of the seat support deck 17B of the partition panel 17 of the floor panel 15 and the stool member 25 for an operator. Control levers 27 are provided at the right and left sides of the operator's seat 26 to control operations of the working mechanism 4.

Denoted at 28 are vehicle control levers and pedals which are provided on the lever/pedal mount portion 16A of the foot rest panel 16 of the floor panel 15, forward of the operator's seat 26. In this instance, regarding to the vehicle control levers and pedals 28, the vehicle control levers are integrally connected with foot-on pedals for synchronized actions. The automotive lower structure 2 can be put in travel either by manual lever operation or by pedal operation.

Indicated at 29 is a cab which is mounted on the floor panel 15 in such a way as to enclose the ambience of the operator's seat 26, and formed in a box-like shape by front panel 29A, rear panel 29B, left side panel 29C, right side panel 29D and top panel 29E. A door (not shown) is fitted in the left side panel 29C to provide a way into and out of the cab 29. Further, front window glass 29F is fitted in the front panel 29A, rear window glass (not shown) is fitted in the rear panel 29B, and right window glass 29G is fitted in the right side panel 29D. On the front side, the cab 29 is bolted to front portions of the foot rest panel 16 of the floor panel 15, and, on the rear side, bolted to the respective fitting holes 18A of the housing mount plate 18.

In this instance, the floor panel 15, operator's seat 26, control levers 27, vehicle control levers/pedals 28 and cab 29 are assembled into one unit, which can be tilted forward or upward as indicated by arrow A or backward or downward as indicated by arrow B by turning about a supporting point on the floor panel support mechanism 21.

Indicated at 30 is a tilting mechanism which is provided between the revolving frame 5 and the floor panel 15, at a position behind the floor panel support mechanism 21. This tilting mechanism 30 is located at the right side of the floor panel 15 and extended in forward and rearward directions. Further, the tilting mechanism 30 is pivotally rocked about a joint pin 32, which is provided on the side of the revolving frame 5 as a pivoting point, and displaceable along with a displacement member 35 on the side of the floor panel 15 as a displacement point. As the displacement member 35 is displaced to an arbitrary position, the floor panel 15 is tilted forward (in the direction of arrow A) or rearward (in the direction of arrow B) to an extent commensurate with the travel distance of the displacement member 35. As shown in FIGS. 10 to 12, the tilting mechanism 30 is largely constituted by a bracket 31, guide rail assembly 33, screw rod 34 and displacement member 35, which will be described hereinafter.

Indicated at 31 is a bracket for mounting the tilting mechanism 30 on the support member 12 on the side of the revolving frame 5. The bracket 31 is constituted by a base plate 31A which is bolted to the inclined surface section 12D1 of the right front support post 12D of the support member 12, and a pair of support plates 31B which are erected on a surface of the base plate 31A to extend in forward and backward directions in parallel relation with each other. Besides, by the support plates 31B each, a fitting base member 33A of a guide rail assembly 33, which will be described hereinafter, is pivotally supported through a pivoting point of a joint pin 32 for upward and downward pivoting movements.

Indicated at 32 is the joint pin by which the fitting base member 33A of the guide rail assembly 33 is pivotally supported on the bracket 31, which is fixed on the support member 12, for upward and downward pivoting movements. In this instance, the joint pin 32 is placed in holes between the support plates 31B of the bracket 31 and the fitting base member 33A of the guide rail assembly 33, providing a pivoting point for the guide rail assembly 33.

Denoted at 33 is a guide rail assembly and the base end of which is vertically pivotally mounted on the right front support post 12D of the support member 12 through the bracket 31. This guide rail assembly 33 is provided to guide a displacement member 35, which will be described hereinafter, linearly between its base end and a fore free end. The guide rail assembly 33 is formed in a rectangular frame-like structure as a whole which is composed of the fitting base member 33A which is vertically pivotally supported on the support plates 31B of the bracket 31 through the joint pin 32, a pair of parallel rail members 33B which are extended from the fitting base member 33A in vertically spaced relation, and an end connector 33C which connects fore ends of the rail members 33B.

As shown in FIG. 11, a rod receptacle hole 33C1 is bored through the end connector 33C between the rail members 33B to receive a fore end portion of the screw rod 34, along with a bearing receptacle hole 33C2 of a larger diameter which is formed continuously on the front side of the rod receptacle hole 33C1 to receive a thrust bearing 34B which rotatably supports a fore end of the screw rod 34.

Denoted at 34 is a screw rod which is extended between and along the rail members 33B of the guide rail assembly 33. The screw rod 34 is tapped with a screw thread around circumferential surface of a round rod-like body, for threaded engagement with a radial tapped hole 35C of the displacement member 35, which will be described hereinafter. Further, a free end 34A of the screw rod 34 is located on the side of the base end, and a thrust bearing 34B and a tool connecting portion 34C are provided at the opposite fore end of the screw rod 34. The tool connecting portion 34C of the screw rod 34 is projected out of the rod receptacle hole 33C1 of the end connector 33C, while the thrust bearing 34B is rotatably supported in the bearing receptacle hole 33C2. The free end 34A of the screw rod 34 is disposed in a free state between the two rail members 33B.

In this instance, when the thrust bearing 34B is fitted in the end connector 33C of the guide rail assembly 33, the free end 34A of the screw rod 34 is extended beyond the position of the displacement member 35. As a result, the free end 34A of the screw rod 34 is extended to a point in the vicinity of the fitting base member 33A of the guide rail assembly 33.

Further, as the floor panel 15 and cab 29 are tilted in forward or upward direction, the thrust bearing 34B of the screw rod 34 rotatably supports the screw rod 34 while sustaining loads which act in the direction toward the base end of the guide rail assembly 33 (in the direction of arrow D).

Furthermore, the tool connecting portion 34C of the screw rod 34 is formed in a hexagonal shape and projected on the front side of the end connector 33C. In this instance, the tool connecting portion 34C is formed in a hexagonal shape in the fashion of a bolt head, so that a screw driving tool like an impact wrench (not shown) can be connected to the screw rod from outside. That is to say, by rotationally driving the screw rod 34 by an impact wrench which is connected to the tool connecting portion 34C, the displacement member 35 which is threaded engagement with the screw rod can be moved along the guide rail assembly 33.

Indicated at 35 is a displacement member which is fitted on the side of the floor panel 15 and at the same time held in threaded engagement with the screw rod 34, providing a displacement point to be translated along the guide rail assembly. When the screw rod 34 is rotationally driven in forward or reverse direction, the displacement member 35 is moved (translated) along the guide rail assembly 33 either in forward direction (in the direction of arrow C) in rearward direction (in the direction of arrow D).

Further, as shown in FIGS. 11 and 12, the displacement member 35 is largely constituted by a stepped columnar shaft 35A which is extended laterally in rightward and leftward directions, a collar portion 35B of a larger diameter which is provided at one end of the shaft 35A on the side away from the floor panel 15, a radial tapped hole 35C which is located at the one end of the shaft 35A and bored in diameter direction of the shaft 35A and tapped with a screw thread around the inner side, and a bolt hole 35D which is bored into the other end of the shaft 35A.

One longitudinal end of the displacement member 35 is displaceably located between the rail members 33B of the guide rail assembly 33. The radial tapped hole 35C is held in threaded engagement with the screw rod 34. At the other longitudinal end of the displacement member 35, the shaft 35A is rotatably fitted in a sleeve 20 which is attached on the upright side panel 19 of the floor panel 15, and dislodgement of the shaft from that position is prevented by a bolt 36 which is threaded into the bolt hole 35D.

With the tilting mechanism 30 which is arranged as described above, by rotationally driving the screw rod 34 by an impact wrench which is connected to the outwardly projected tool connecting portion 34C of the screw rod 34, the displacement member 35 which is in threaded engagement with the screw rod 34 is displaced along the guide rail assembly 33 in the direction of arrow C. As a result, by the tiling mechanism 30 the displacement member 35 is moved away from the support member 12 of the side of the revolving frame 5 to increase the distance therefrom, and the floor panel 15 which is connected with the displacement member 35 is tilted forward or upward in the direction of arrow A (a tilt-up), turning about a supporting point on the floor panel support mechanism 21.

Further, since the tilting mechanism 30 employs the screw rod 34 and the displacement member 35 which are in threaded engagement with each other, it is immune from a abrupt downfall of the floor panel 15 as caused, for example, by gas leaks in case the floor panel is supported by gas dampers. Accordingly, there is no need for providing a stopper for the floor panel.

On the other hand, upon rotationally driving the screw rod 34 in the reverse direction, the displacement member 35 is moved along the guide rail assembly 33 toward the fitting base member 33A (in the direction of arrow D) to decrease the distance between the support member 12 and the displacement member 35, and the floor panel 15 is tilted rearward or downward in the direction of arrow B (a tilt-down), turning about a supporting point on the floor panel support mechanism 21.

Further, the thrust bearing 34B at the fore end of the screw rod 34 is fitted in the end connector 33C of the guide rail assembly 33, while the other or base end portion of the screw rod is disposed as a free end 34A. Therefore, in the event the screw rod 34 is turned in a distorted state, the free end 34A of the screw rod is an oscillating motion in a free state to reduce operational resistance as caused by distortion of the screw rod.

Being arranged in the manner as described above, the hydraulic excavator 1 of the first embodiment of the invention is operated in the manner as follows.

In the first place, an operator takes the operator's seat 26 and operates the vehicle control levers and pedals 28 to move the automotive lower structure 2. In order to excavate a ground by the front working mechanism 4, the working mechanism control levers 27 are manipulated by the operator.

Figure 14:
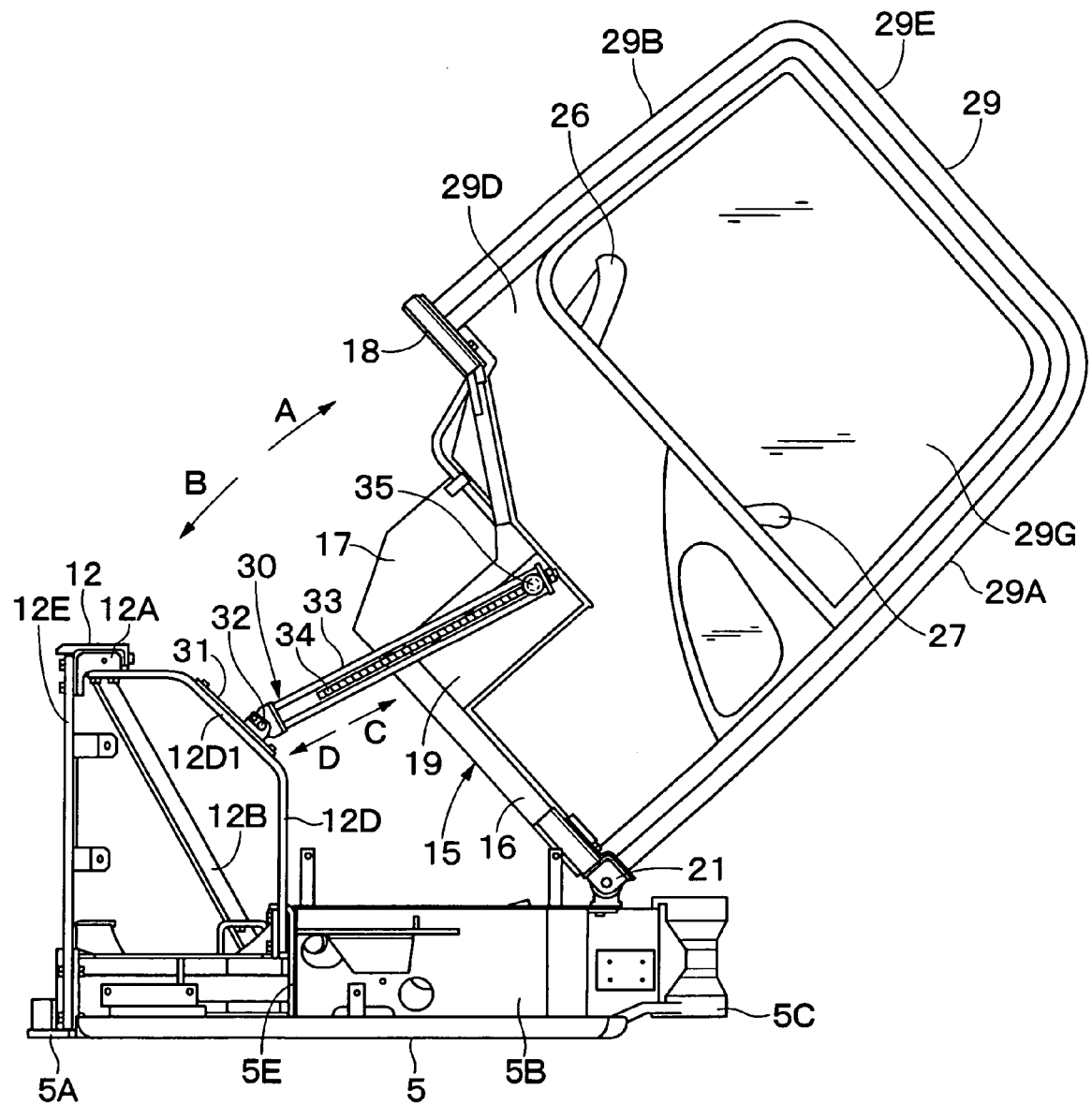
FIG. 14 is a front view taken from the same direction as FIG. 7, showing the floor panel and cab of the upper revolving structure which are tilted up by the tilting mechanism.

In the next place, a maintenance checkout is carried out in the manner as follows. The engine 6, hydraulic pump 7, control valve 11, which needs a maintenance checkout, are located under the floor panel 15. Therefore, it becomes necessary to tilt up the floor panel 15 in the direction of arrow A together with the cab 29 as shown in FIGS. 13 and 14.

A job of tilting up the floor panel 15 and cab 29 is started with removal of bolts which fix the housing mount plate 18 of the floor panel 15 to the support member 12 of the revolving frame 5. After removal of bolts, the support member 12 of the revolving frame 5 connected with the floor panel 15 only by way of the displacement member 35 which is in threaded engagement with the screw rod 34 of the tilting mechanism 30. Therefore, different from gas dampers in prior art tilt-up mechanisms, the floor panel 15 would not jump up at the instant bolts are removed, and the floor panel 15 can be tilted up in a smooth and safe manner.

Thereafter, an impact wrench is connected to the tool connecting portion 34C at the fore end of the screw rod 34 of the tilting mechanism 30 in order to rotationally drive the screw rod 34. By rotationally driving the screw rod from outside, the displacement member 35 can be moved along the guide rail assembly 33 in the direction of arrow C. As a consequence, the floor panel 15 and the cab 29 which are connected with the displacement member 35 are tilted up in an upward or forward in the direction of arrow A as shown in FIGS. 13 and 14, turning about a supporting point on the floor panel support mechanism 21.

The rear side of the floor panel 15 can be widely lifted up by relocating the displacement member 35 at a position close to the fore end of the guide rail assembly 33. When the floor panel 15 is tilted up in the manner, the engine 6 is mostly exposed on its front and upper sides so that one can reach his or her hands to carry out maintenance and service including inspection and repair work and replacement of the control valve 11.

When rotation of the screw rod 34 is stopped at a halfway point, the displacement member 35 is likewise stopped at a halfway point in the longitudinal direction of the guide rail assembly 33. Accordingly, by stopping the rotation of the screw rod 34 at a halfway point, the floor panel 15 can be stopped and retained in an arbitrary tilted position without using a stopper. Thus, instead of tilting up the floor panel 15 overly to an excessive degree, the tilt-up of the floor panel 15 can be stopped at a suitable position for carrying out and completing an intended maintenance and service work in an efficient manner.

Besides, since no gas dampers exist between the revolving frame 5 and the floor panel 15, an ample space can be secured for carrying out maintenance and service work. Further, having the screw rod 34 and the displacement member 35 in threaded engagement with each other, the tilting mechanism 30 can function as a stopper for preventing an abrupt downfall of the floor panel 15, which would otherwise be caused, for example, by gas leaks from gas dampers unless a safety stopper is provided.

On the other hand, after finishing maintenance and service jobs, the screw rod 34 is rotated in the reverse direction by the impact wrench to move the displacement member 35 in the direction of arrow D toward the fitting base member 33A along the guide rail assembly 33 to tilt down the floor panel 15 and the cab 29 in the direction of arrow B. Then, the housing mount plate 18 on the side of the floor panel 15 is fixed by bolts to the support member 12 to complete the maintenance and service.

Thus, according to the first embodiment of the invention, the tilting mechanism 30 is provided between the revolving frame 5 and the floor panel 15, and the screw rod 34 of the tilting mechanism 30 is rotated to move the displacement member 35, which is in threaded engagement with the screw rod 34, toward the fore end of the screw rod 34. As a result of the forward movement of the displacement member, the floor panel 15 and the cab 29 are tilted forward in the direction of arrow A to expose the engine 6.

In this case, as the displacement member 35 of the tilting mechanism 30 is moved in the direction of arrow C by rotation of the screw rod 34, the floor panel 15 is tilted forward to an extent commensurate with a distance of movement of the displacement member 35. In so doing, the distance of movement of the displacement member 35 can be set at an arbitrary value by stopping rotation of the screw rod 34 at a halfway point. Therefore, it becomes possible to set the extent of tilt of the floor panel 15 freely in consideration of the nature of a maintenance and service job to be performed. As a consequence, for example, at the time of a maintenance and service work on the engine, the floor panel can be tilted up to a suitable degree to complete necessary jobs in an efficient manner.

Further, the tilting mechanism 30 is arranged to tilt the floor panel 15 by threaded engagement of the screw rod 34 and the displacement member 35. Therefore, the tilting mechanism 30 can fix the floor panel at an arbitrary tilted position without interposing a stopper between the revolving frame 5 and the floor panel 15, making it possible to complete a necessary job in an efficient manner. Moreover, in the case of the tilting mechanism 30 which permits to set the extent (angle) of tilt of the floor panel 15, it becomes possible to tilt up the floor panel 15 only to a slight degree at the time of a simple job, making it possible to carry out a job in an efficient manner.

There is still another advantage that, when the floor panel 15 is tilted up, an ample working space is opened up between the revolving frame 5 and the tilted floor panel 15, free of obstacles such as gas dampers. Therefore, a service man can easily reach the engine 6, control valve 11 or other equipments to perform and complete maintenance jobs efficiently in a facilitated and safe manner.

Furthermore, in tilting the floor panel 15, the tilting mechanism 30 utilizes threaded engagement of the screw rod 34 and the displacement member 35. Therefore, the floor panel 15 can be tilted through a greater angle by increasing the length of the screw rod 34 (of the guide rail assembly 33). In this case, upon tilting the floor panel, a broader space for maintenance jobs is opened up between the revolving frame 5 and the floor panel 15.

Unlike gas dampers, the tilting mechanism 30 does not use constant biasing force. Therefore, there is no need to apply a large force at the time of tilting up or down the floor panel 15. This means that the floor panel 15 can be tilted up or down in a safe and facilitated manner.

Figure 20:
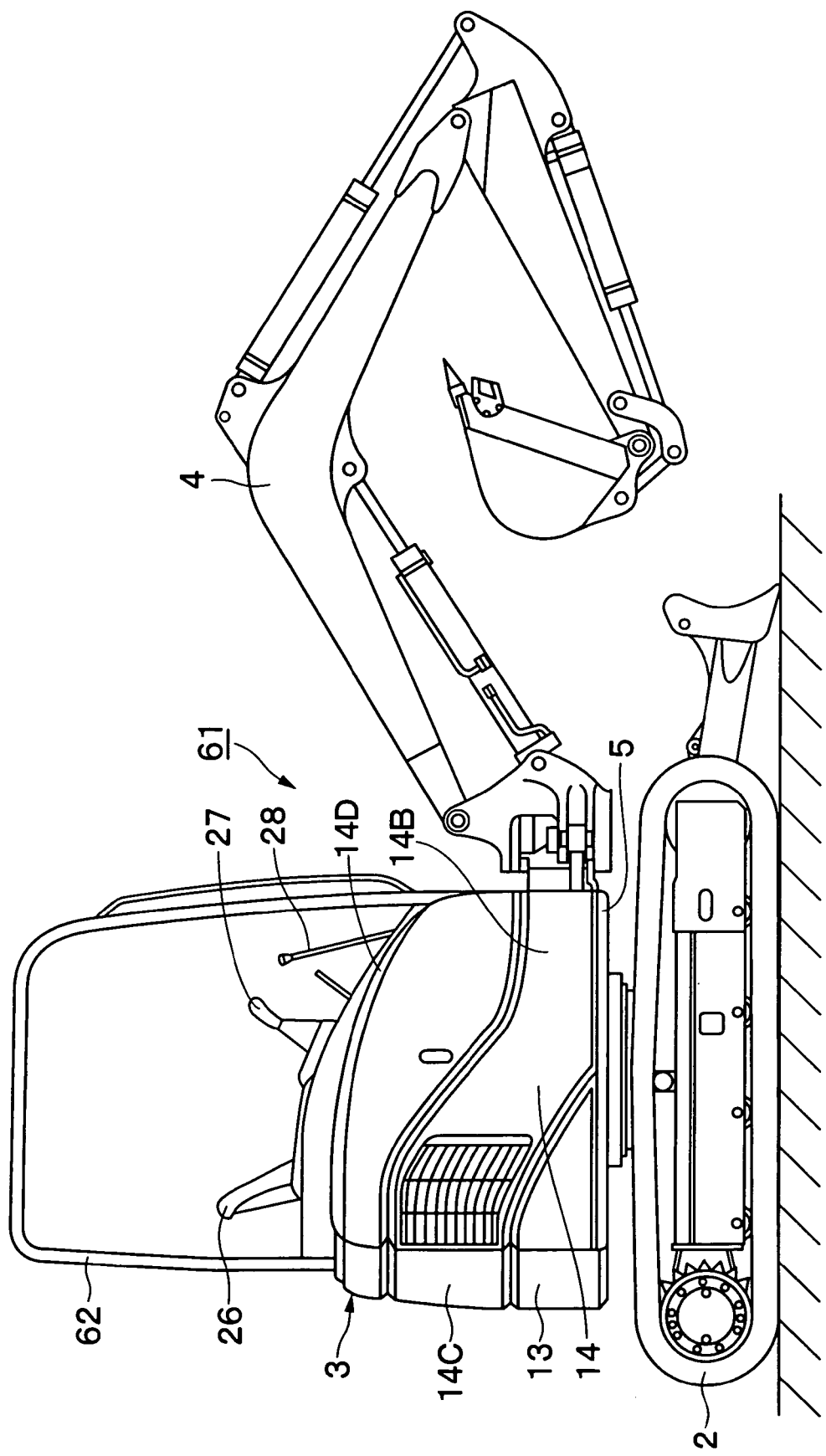
FIG. 20 is a front view of a canopy-furnished hydraulic excavator in a second modification of the present invention.

On the other hand, the guide rail assembly 33 of the tilting mechanism 30 is attached to the support member 12 through the bracket 31, while the displacement member 35 is attached to the upright side panel 19 of the floor panel 15. Therefore, the tilting mechanism 30 can be incorporated easily into existing construction machines at a low cost. Since the displacement member 35 is attached to the upright side panel 19 of the floor panel 15, the floor panel 15 can cope with not only a construction machine which is furnished with a cab 29 but also a construction machine which is furnished with a canopy 62 as shown in FIG. 20.

Further, the fore end of the tilting mechanism 30 is turned obliquely upward when the floor panel 15 tilted up. In this connection, since the base end of the tilting mechanism 30 is supported on the inclined surface section 12D1 on the right front support post 12D of the support member 12, the large load resulting from tilt-up of the floor panel 15 is securely sustained by the inclined surface section 12D1.

Moreover, the fore end portion of the screw rod 34 of the tilting mechanism 30 is fitted in the end connector 33C of the guide rail assembly 33 but its base end portion is disposed as a free end 34A. Therefore, when the screw rod 34 is rotated in a distorted state, the free end 34A is put in an oscillating motion to minimize operational resistance, improving the efficiency of the tilt-up operation and prolonging the service life of the tilting mechanism.

Further, the tool connecting portion 34C is provided at the fore end of the screw rod 34 for connection of an impact wrench or other screw driving tool. Therefore, the floor panel 15 can be tilted up easily by rotationally driving the screw rod 34 from outside by means of an impact wrench which is connected to the tool connecting portion 34C.

Now, turning to FIGS. 15 to 18, there is shown a second embodiment of the present invention; This embodiment has features in that the screw rod is extended between a pair of rail members of the guide rail members, and a base end portion of the screw rod 34 is fitted in a fitting base member of the guide rail assembly while a fore end portion of the screw rod is projected forward through and out of the end connector of the guide rail assembly. In the following description of the second embodiment, those component parts which are identical with counterparts in the foregoing first embodiments are simply designated by the same reference numerals and characters to avoid repetitions of same explanations.

Figure 15:
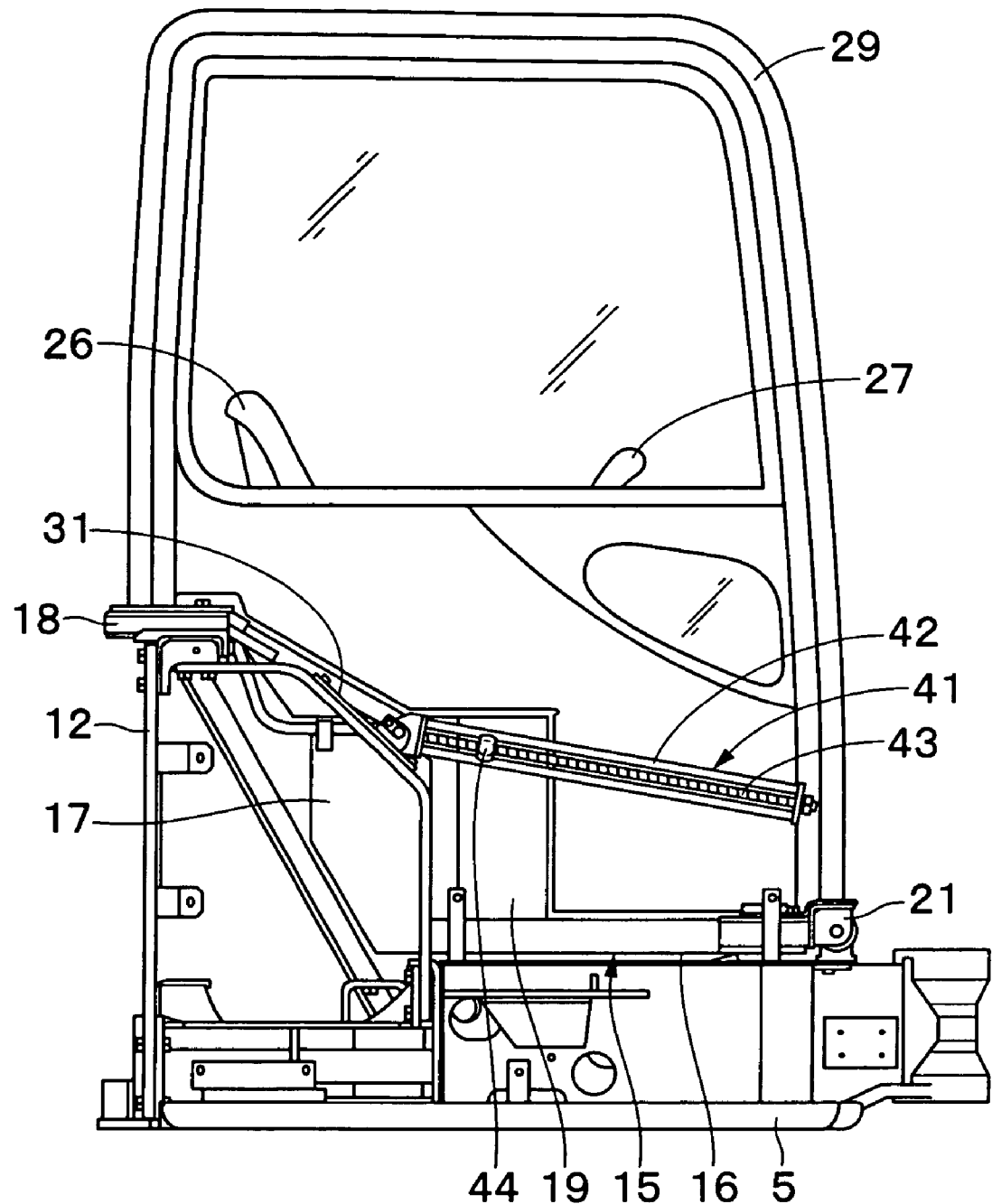
FIG. 15 is a front view of an upper revolving structure of a hydraulic excavator incorporating a second embodiment of the present invention, with an exterior cover, engine and tank removed therefrom.

In FIG. 15, indicated at 41 is a tilting mechanism according to the second embodiment. This tilting mechanism 41 is largely constituted by a bracket same as the bracket 31 in the foregoing first embodiment, and a guide rail assembly 42, screw rod 43 and displacement member 44 as described below.

Figure 16:
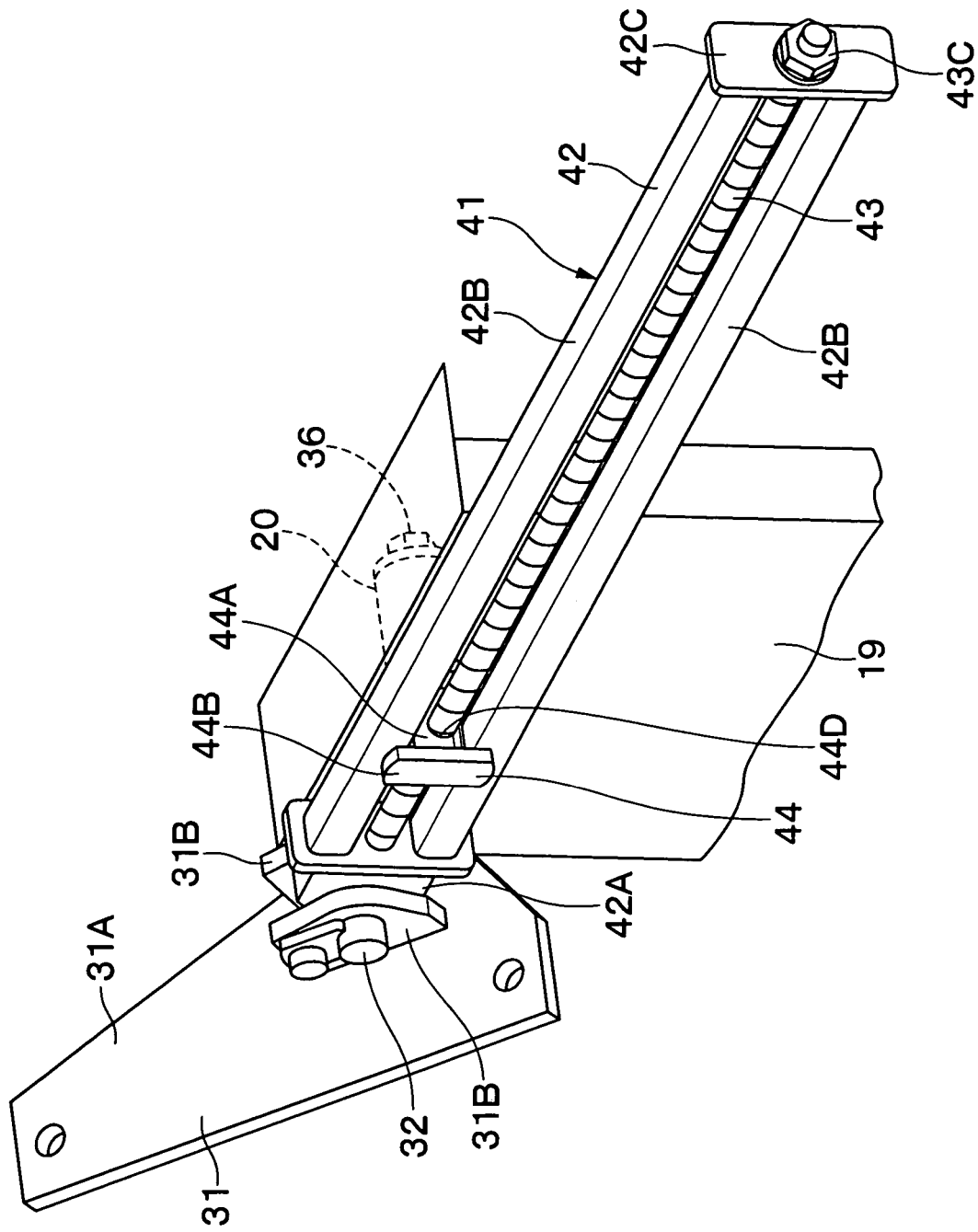
FIG. 16 is a perspective view, on an enlarged scale, of a tilting mechanism and associated parts shown in FIG. 15.
Figure 17:
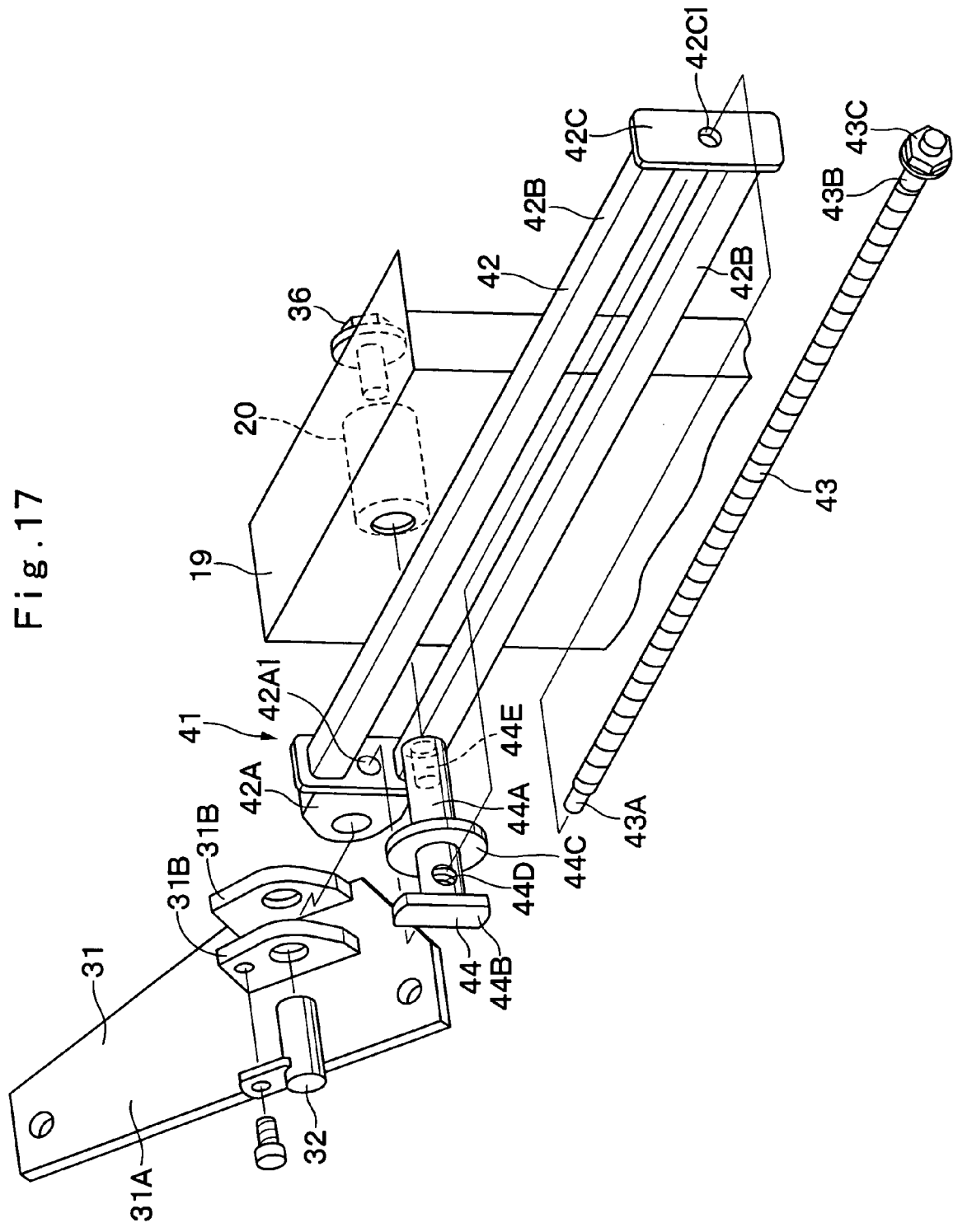
FIG. 17 is an exploded perspective view of the tilting mechanism and associated parts.

Indicated at 42 is a guide rail assembly of the tilting mechanism 41. As shown in FIGS. 16 and 17, the guide rail assembly 42 is constituted by a fitting base member 42A, rail members 42B and an end connector 42C substantially in the same manner as the guide rail assembly 33 in the foregoing first embodiment. However, in the case of the second embodiment, an axial supporting hole 42A1 is bored into the fitting base member 42A for rotatably supporting a rear shaft portion 43A of the screw rod 43. Further, an axial hole 42C1 is bored through the end connector 42C to receive a fore shaft portion 43B of the screw rod 43 in a rotatable state.

Denoted at 43 is a screw rod which is extended between the rail members 42B of the guide rail assembly 42. As described above, a rear shaft portion 43A at the base end of the screw rod 43 is rotatably fitted in the axial supporting hole 42A1 which is bored into the fitting base member 42A, while a fore shaft portion 43B of the screw rod 43 is rotatably fitted in and projected forward through the axial hole 42C1 which is axially bored through the end connector 42C. Further, the screw rod 43 is provided with a tool connecting portion 43C at a fore distal end of the fore shaft portion 43B. Namely, the screw rod 43 is supported on the guide rail assembly 42 at opposite ends thereof, i.e., at the positions of the rear and fore shaft portions 43A and 43B.

Figure 18:
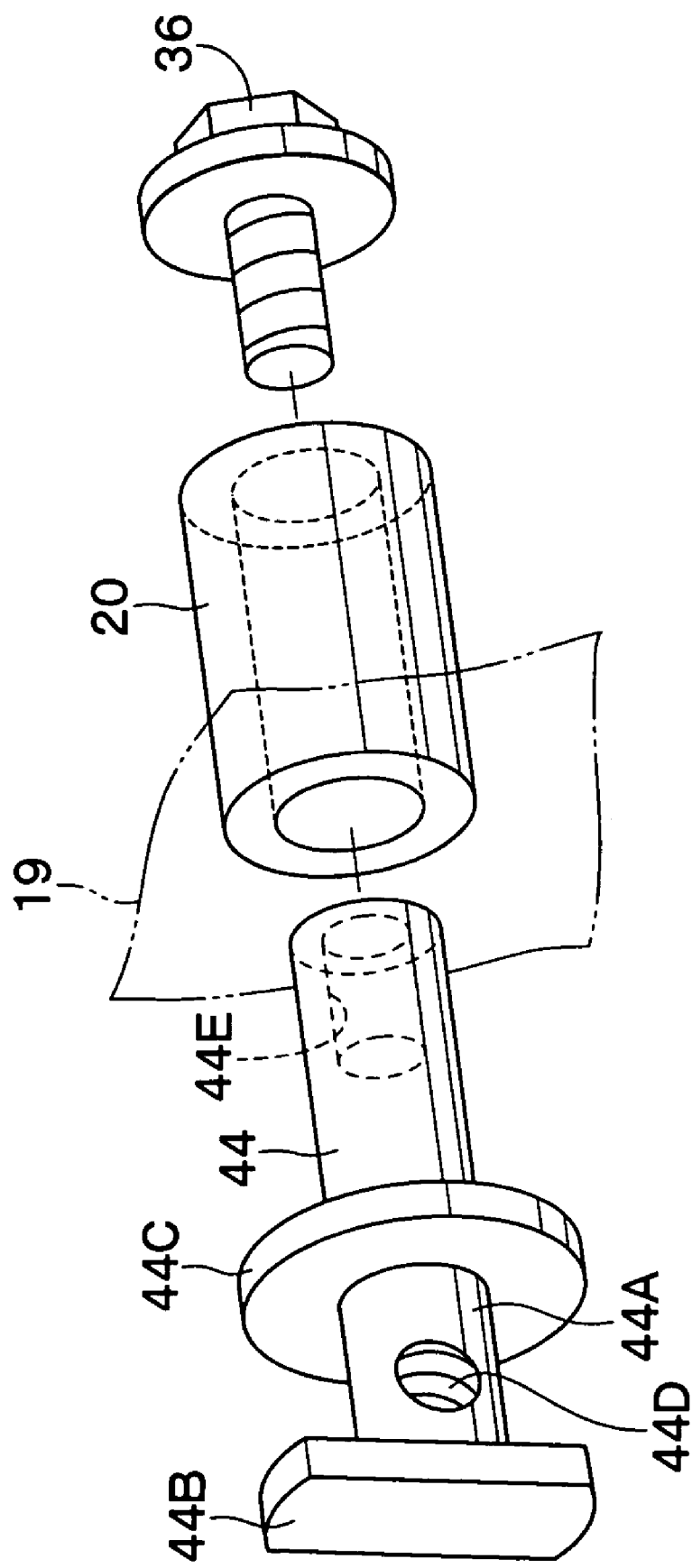
FIG. 18 is an exploded perspective view showing, on an enlarged scale, a displacement member, sleeve and bolt of the tilting mechanism.

Indicated at 44 is a displacement member which is moved along the rail members 42B of the guide rail assembly 42. As shown in FIGS. 17 and 18, this displacement member 44 is provided with a columnar shaft 44A which is passed between the rail members 42B at one longitudinal end portion, first and second collar portions 44B and 44C which embrace the rail members 42B from opposite sides, and a radial tapped hole 44D in threaded engagement with the screw rod 43. The other end of the columnar shaft 44A is fitted in a sleeve 20 on the upright side panel 19 of the floor panel 15. In this state, a bolt 36 is threaded into a bolt hole 44E to prevent dislodgement from the sleeve.

Being arranged as described above, the second embodiment can produce substantially the same operational effects as the foregoing first embodiment of the invention. Especially in the case of the second embodiment, the screw rod 43 is supported at opposite ends on the guide rail assembly 42, that is, the screw rod 43 is assembled more strongly in a stabilized state. This contributes to improve the action of the displacement member 44 and to prolong the service life of the screw rod 43.

In the foregoing first embodiment, the guide rail assembly 33 and the screw rod 34 of the tilting mechanism 30 are in such relations that, when the tool connecting portion 34C at the fore end is fitted in the end connector 33C of the guide rail assembly 33, the free end 34A is located at a position which is largely spaced from the fitting base member 33A.

Figure 19:
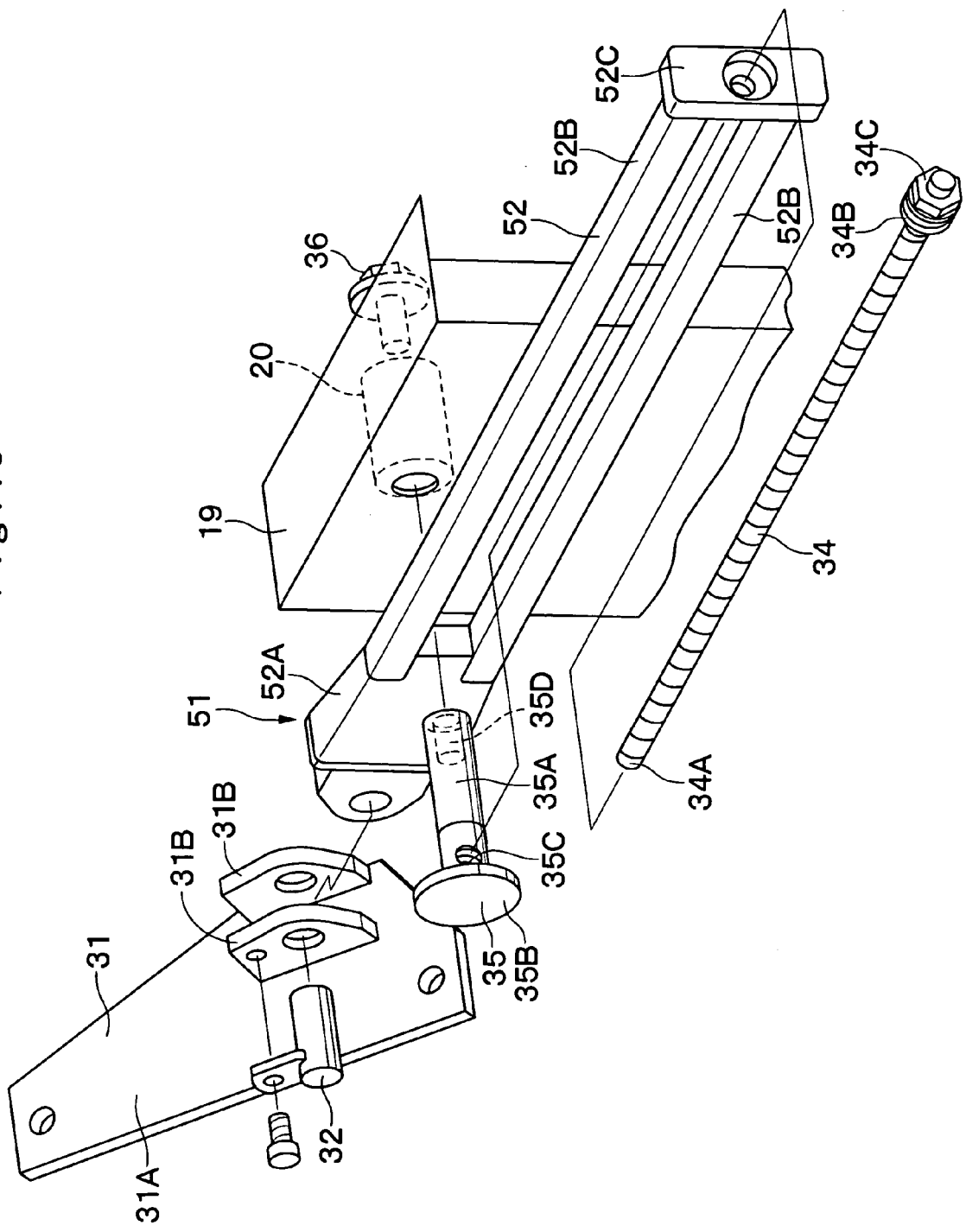
FIG. 19 is an exploded perspective view of a tilting mechanism and associated parts in a first modification of the present invention.

However, in this regard, the present invention is not limited to the particular arrangement shown. For example, like a tilting mechanism 51 which is shown as a first modification in FIG. 19, there may be employed a guide rail assembly 52 with a fitting base member 52A of a different shape. The fitting base member 52A is extended up to a point in the vicinity of the free end 34A of the screw rod 34, and rail members 52B are attached to the extended fore end of the fitting base member 52A.

In this case, it becomes possible to shorten the length of the rail members 52B which are lower in strength as compared with the fitting base member 52A. That is to say, it becomes possible to enhance the strength of the guide rail assembly 52 as a whole, enhancing rigidity against buckling.

The arrangements of the above-described first modification can also be similarly applied to the second embodiment. For application to the second embodiment, the length of the screw rod is shortened to match the length of the rail members of the guide rail assembly.

In the second embodiment, the displacement member 44 of the tilting mechanism 41 is moved along the guide rail assembly 42 while keeping threaded engagement with the screw rod 43. However, the present invention is not limited to this particular arrangement. For example, in case the screw rod 43 has sufficient strength, arrangements may be made to support the base end portion (the rear shaft portion 43A) of the screw rod 43 directly on the bracket 31 of the support member 12 in the fashion of a cantilever. In case the screw rod 43 is supported directly on the bracket 31, the guide rail assembly 42 can be omitted.

Further, in the foregoing embodiments, the present invention is applied to a cab type hydraulic excavator 1 which is furnished with the cab 29 being attached a door on a left side panel 29C in a box-like shape, enclosed by front panel 29A, rear panel 29B, left side panel 29C, right side panel 29D and top panel 29E. However, needless to say, the present invention is applicable to other types of construction machine, for example, to a canopy type hydraulic excavator 61 which is shown as a second modification in FIG. 20. In the case of this canopy type hydraulic excavator 61, a canopy 62 is provided over an operator's seat 26.

In addition to the above-mentioned hydraulic excavators 1 and 61, the present invention is applicable to other hydraulic excavators which are not furnished with a cab or canopy, only with an operator's seat on a floor panel.

Further, the present invention is widely applicable to other construction machines with a floor panel and an operator's seat.

The invention claimed is:

1. A construction machine having a frame which is provided with a working mechanism located on the front side thereof, an engine located in a rear side of said frame, a floor panel provided on said frame in front of said engine, and an operator's seat provided on said floor panel, characterized in that said construction machine comprises:
    a floor panel support mechanism provided between front end portions of said frame and floor panel, and connected to front end of said floor panel through a supporting point in tilting up and down said floor panel together with said operator's seat;
    a tilting mechanism provided between said frame and said floor panel on the rear side of said floor panel support mechanism and comprising a screw rod having a base end thereof pivotally supported on said frame, and a displacement member provided between said floor panel and said screw rod and held in threaded engagement with said screw rod for translational movement according to rotation of said screw rod; and
    said tilting mechanism being adapted to tilt up and down said floor panel by way of a pivoting point provided at a base end of said screw rod and a displacement point provided at said displacement member and translated to an arbitrary position, tilting up said floor panel in forward direction to a degree commensurate with a distance of travel of said displacement point in forward direction.

2. A construction machine as defined in claim 1, wherein said tilting mechanism is mounted on a side panel of said floor panel to extend in forward and rearward directions of the machine, and said displacement point is moved forward or rearward by an externally applied driving force to said screw rod.

3. A construction machine as defined in claim 1, wherein said tilting mechanism comprises a guide rail assembly having a base end thereof pivotally supported on the side of said frame for upward and downward pivoting movements and having a fore end extended forward in a free state; said screw rod extended along and in longitudinal direction of said guide rail assembly and rotatably supported on said guide rail assembly; and said displacement member being rotatably mounted on the side of said floor panel and held in threaded engagement with said screw rod for movement in forward and rearward directions along said guide rail assembly.

4. A construction machine as defined in claim 3, wherein said guide rail assembly is in the form of a rectangular frame comprising a fitting base member pivotally supported on the side of said frame, a pair of rail members extended forward from said fitting base member in parallel relation with each other, and an end connector attached to and connecting fore ends of said rail members;
    said screw rod being extended between said rail members, having a base end disposed in a free state and having a fore end fitted in said end connector;
    said displacement member being located between said rail members of said guide rail assembly and held in threaded engagement with said screw rod; and
    said displacement member being translated along said guide rail assembly upon rotationally driving a fore end of said screw rod.

5. A construction machine as defined in claim 3, wherein said guide rail assembly is in the form of a rectangular frame comprising a fitting base member pivotally supported on the side of said frame, a pair of rail members extended forward from said fitting base member in parallel relation with each other, and an end connector attached to and connecting fore ends of said rail members;
    said screw rod being extended between said rail members, and having a base end and a fore end thereof fitted in said fitting base member and said end connector, respectively;
    said displacement member being located between said rail members of said guide rail assembly and held in threaded engagement with said screw rod; and
    said displacement member being translated along said guide rail assembly upon rotationally driving a fore end of said screw rod.

6. A construction machine as defined in claim 3, further comprising a support member provided on said frame in the vicinity of said engine to support a rear side portion of said floor panel; and
    said guide rail assembly of said tilting mechanism having a base end thereof being pivotally supported on said support member and said displacement member of said tilting mechanism being mounted on a side panel portion of said floor panel.

7. A construction machine as defined in claim 6, wherein said support member comprises a support base extended laterally in rightward and leftward directions over said engine, and a plural number of posts extended downward from said support base and attached to said frame;
    one of said posts at a lateral side of said floor panel being angularly bent in forward direction to provide an inclined surface section thereon; and
    a bracket being mounted on said inclined surface section to support a base end of said tilting mechanism.

8. A construction machine as defined in claim 1 wherein said floor panel comprises a foot rest panel supporting feet of an operator who is seated on operator's seat, a partition panel rising upward from a rear side of said foot rest panel and extended rearward over said engine, and a side panel rising upright at a lateral side of said foot rest panel; and
    said displacement member of said tilting mechanism being mounted on said side panel of said floor panel.

9. A construction machine as defined in claim 1 wherein said screw rod is provided with a tool connecting portion at a fore end thereof to permit connection of a screw driving tool for rotationally driving of said screw rod.

* * * * *